(12) United States Patent
Cypher et al.

(10) Patent No.: US 9,311,194 B1
(45) Date of Patent: Apr. 12, 2016

(54) EFFICIENT RESOURCE UTILIZATION IN DATA CENTERS

(71) Applicant: Google Inc., Mountain View, CA (US)

(72) Inventors: Robert Cypher, Saratoga, CA (US); Healfdene Goguen, South Orange, NJ (US); Steven Robert Schirripa, Hazlet, NJ (US); Christian Eric Schrock, Cold Spring Harbor, NY (US)

(73) Assignee: Google Inc., Mountain View, CA (US)

( * ) Notice: Subject to any disclaimer, the term of this patent is extended or adjusted under 35 U.S.C. 154(b) by 195 days.

(21) Appl. No.: 14/229,313

(22) Filed: Mar. 28, 2014

(51) Int. Cl.
*G06F 11/00* (2006.01)
*G06F 11/14* (2006.01)
*G06F 9/50* (2006.01)

(52) U.S. Cl.
CPC .......... *G06F 11/1474* (2013.01); *G06F 9/5083* (2013.01)

(58) Field of Classification Search
USPC .......................................................... 714/47
See application file for complete search history.

(56) References Cited

U.S. PATENT DOCUMENTS

| | | | |
|---|---|---|---|
| 7,930,611 B2 | 4/2011 | Huang et al. | |
| 8,285,686 B2 | 10/2012 | Kesselman | |
| 8,341,457 B2 | 12/2012 | Spry et al. | |
| 8,615,698 B1 | 12/2013 | Cypher | |
| 2005/0125521 A1* | 6/2005 | Grimm | G06F 9/5083 709/223 |
| 2013/0067464 A1* | 3/2013 | Shah | G06F 9/5077 718/1 |

OTHER PUBLICATIONS

CC. Huang, M. Chen, and J. Li, "Pyramid Codes: Schemes to Trade Space for Access Effciency in Reliable Data Storage Systems,"Proc. of IEEE NCA, Cambridge, MA, Jul. 2007.

* cited by examiner

*Primary Examiner* — Sarai Butler
(74) *Attorney, Agent, or Firm* — Honigman Miller Schwartz and Cohn LLP

(57) ABSTRACT

A method for efficiently using resources (e.g., memory devices) in data centers of a distributed storage system includes identifying high-availability jobs and low-availability jobs that demand usage of resources of the distributed system. The method further includes allocating resource usage to the jobs, determining a first load of the jobs on resources available during a failure event, and determining a second load of the jobs on the resources lost during the failure event. The method includes determining a scaled third load of the jobs on the resources available during the failure event based on the first and second loads and reallocating resource usage assigned to the low-availability jobs to the high-availability jobs during the failure event. The reallocation is associated with the scaled third load of the jobs.

32 Claims, 17 Drawing Sheets

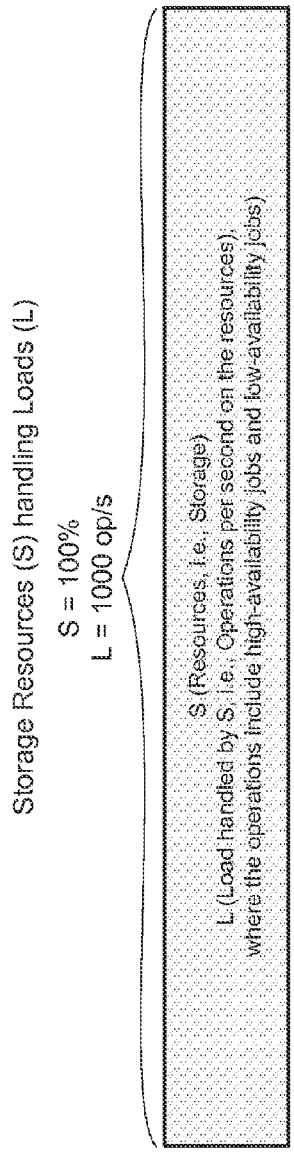
FIG. 5A: Before Maintenance
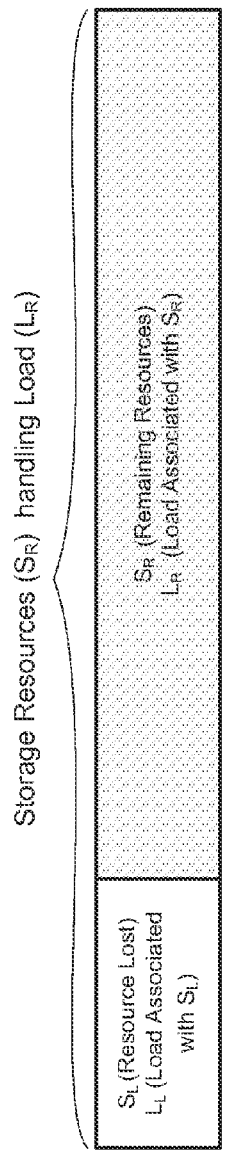
FIG. 5B: Determining $L_L$
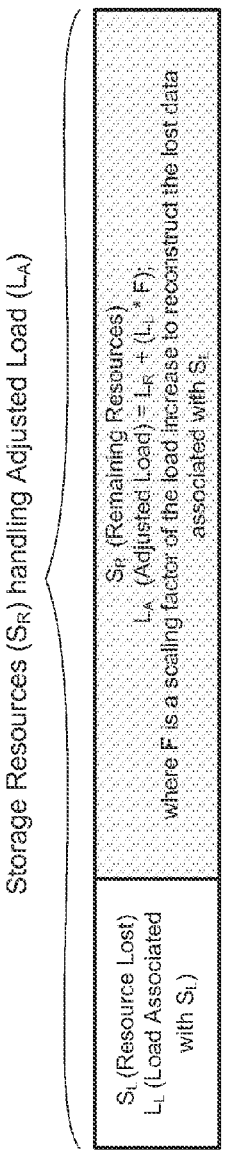
FIG. 5C: Determining $L_A$ $S = 100\%$
$L = 1000$ op/s $S_L = 5\%$
$L_L = 50$ op/s Storage Resources ($R_R$) handling Load ($L_R$)

$S_R = 95\%$
$L_A = L_R + (L_L * F) = 950 + (50*8) = 1350$ op/s

FIG. 5D: Reed-Solomon $S = 100\%$
$L = 1000$ op/s $S_L = 5\%$
$L_L = 50$ op/s

Storage Resources ($S_R$) handling Adjusted Load ($L_A$)

$S_R = 95\%$
$L_A = L_R + (L_L * F) = 950 + (50*2) = 1050$ op/s

FIG. 5E: Nested Coding

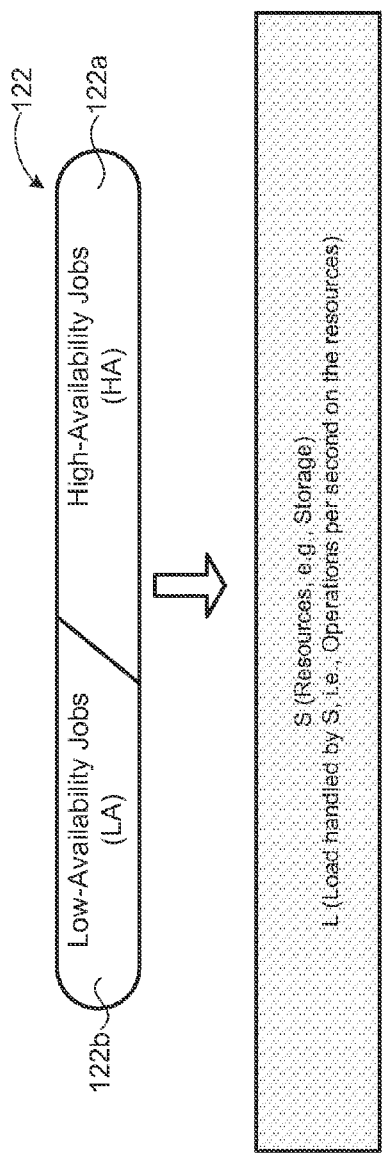
FIG. 6A: Before Maintenance
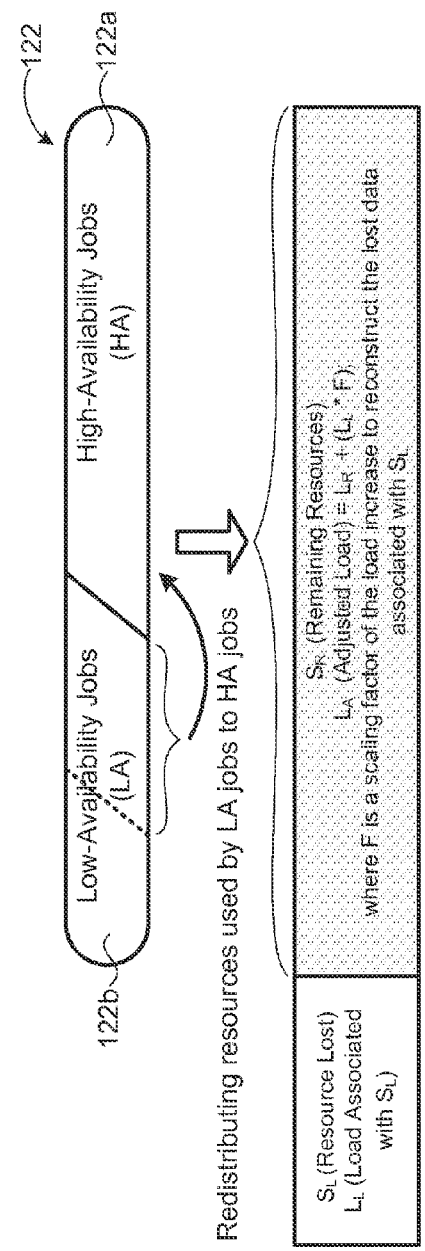
FIG. 6B: Determining $L_A$

EFFICIENT RESOURCE UTILIZATION IN DATA CENTERS

TECHNICAL FIELD

This disclosure relates to efficiently using storage resources in data centers during maintenance or a failure of one or more of the storage resources.

BACKGROUND

A distributed system generally includes many loosely coupled computers, each of which typically includes a computing resource (e.g., one or more processors) and/or storage resources (e.g., memory, flash memory, and/or disks). A distributed storage system overlays a storage abstraction (e.g., key/value store or file system) on the storage resources of a distributed system. In the distributed storage system, a server process running on one computer can export that computer's storage resources to client processes running on other computers. Remote procedure calls (RPC) may transfer data from server processes to client processes. Alternatively, Remote Direct Memory Access (RDMA) primitives may be used to transfer data from server hardware to client processes.

SUMMARY

One aspect of the disclosure provides a method, executed on a data processing device, for efficiently using resources (e.g., memory devices) in data centers of a distributed storage system. The method includes identifying high-availability jobs and low-availability jobs that demand usage of resources of the distributed system. The method further includes allocating resource usage to the jobs, determining a first load of the jobs on resources available during a failure event, and determining a second load of the jobs on the resources lost during the failure event. The method includes determining a scaled third load of the jobs on the resources available during the failure event based on the first and second loads and reallocating resource usage assigned to the low-availability jobs to the high-availability jobs during the failure event. The reallocation is associated with the scaled third load of the jobs.

Implementations of the disclosure may include one or more of the following features. In some implementations, the high-availability jobs have a higher execution priority than the low-availability jobs. The resources may include non-transitory memory devices.

In some implementations, determining the scaled third load of the jobs includes using a scaling factor corresponding to an increased load on the resources available during the failure event to handle any jobs associated with the resources lost during the failure event. The scaling factor is based on a type of encoding of data.

In some examples, when the resources include data storage resources having spindles and the jobs all include high-availability read jobs or low-availability read jobs, the method includes determining a number of read requests per spindle for reallocating the resource usage based on the read requests per spindle. Additionally or alternatively, the method includes determining a read maximum fraction for reallocating the resource usage based on the read maximum fraction.

In some implementations, when the resources include data storage resources having spindles and the jobs all include high-availability jobs or low-availability jobs, the method includes determining an adjusted request for read operations during the failure event used for reallocating the resource usage based on the adjusted request for read operations. Additionally or alternatively, the method includes determining an overall spindle demand during the failure event for reallocating the resource usage based on the overall spindle demand during the failure event. The method may further include determining a fraction spindle quota increase per spindle for reallocating the resource usage based on the fraction spindle quota increase. Additionally or alternatively, the method may include determining a fraction spindle quota available for the high-availability jobs considered for reallocating the resource usage based on the fraction spindle quota.

In some examples, the method includes determining a low-availability scaled third load of the jobs on temporary resources available during the failure event based on the first and second loads of low-availability jobs. When the resources include data storage resources having spindles, the method may include determining a fraction of high-availability spindle usage prior to the failure event for reallocating the resource usage based on the fraction of high-availability spindle usage. Additionally or alternatively, the method includes determining an increase factor of low-availability job usage for reallocating the resource usage based on the increase factor of low-availability job usage.

In some implementations, the method includes determining a total of low-availability usage per spindle after a resource is lost for reallocating the resource usage based on the total of low-availability usage per spindle. Additionally or alternatively, the method further includes determining a total spindle usage for reallocating the resource usage based on the total spindle usage.

Another aspect of the disclosure provides a method, executed on a data processing device, for identifying high-availability jobs and low-availability jobs that demand usage of data storage resources of a distributed storage system. The data storage resource has spindles. The method further includes determining a spindle quota for the high-availability jobs and determining a spindle quota for the low-availability jobs. The method further includes redistributing at least a portion of the spindle quota associated with the low-availability jobs to the high-availability jobs during a failure event.

In some examples, when the jobs all include high-availability read jobs or low-availability read jobs, the method includes determining a number of read requests per spindle when a loss of at least one data storage resource occurs. The method also includes determining a read maximum fraction to reallocate the resource usage based on the read requests per spindle or the read maximum fraction.

In some implementations, when the jobs all include high-availability jobs or low-availability jobs, the method includes determining a fraction spindle quota increase per spindle and a fraction spindle quota available for the high-availability jobs for reallocating the resource usage based on the fraction spindle quota increase or the fraction spindle quota. The method further includes determining a low-availability scaled third load of the jobs on temporary resources available during the failure event based on the first and second loads of availability jobs.

In some examples, when the resources include data storage resources having spindles, the method includes determining a fraction of high-availability spindle usage for reallocating the resource usage based on the fraction of high-availability spindle usage. Additionally or alternatively, the method includes determining an increase factor of low-availability job usage and determining a total of low-availability usage per spindle for real locating the resource usage based on the total of low-availability usage per spindle. The method may further include determining a total spindle usage for reallocating the resource usage based on the total spindle usage.

Yet another aspect of the disclosure provides a system for efficiently using resources (e.g., processors and/or memory devices) in data centers. The system includes resources of a distributed storage system and a computer processor in communication with the resources. The computer processor identifies high-availability jobs and low-availability jobs that demand usage of resources of a distributed storage system. The high-availability jobs have a higher execution priority than the low-availability jobs. The computer processor also allocates resource usage to the jobs, determines a first load of the jobs on resources available during a failure event, determines a second load of the jobs on resources lost during the failure event and determines a scaled third load of the jobs on the resources available during the failure event based on the first and second loads. The computer processor further reallocates resources usage assigned to the low-availability jobs to the high-availability jobs during the failure event. The reallocation is associated with the scaled third load of the jobs. In some examples, the resources include non-transitory memory devices.

In some implementations, the computer processor determines the scaled third load of the jobs by using a scaling factor corresponding to an increased load on the resources available during the failure event to handle any jobs associated with the resources lost during the failure event. The scaling factor is based on a type of encoding of data. When all the jobs include high-availability read jobs or low-availability read jobs, the computer processor determines a number of read requests per spindle and determines a read maximum fraction, which are used for reallocating the resource usage based on the read requests per spindle or the read maximum fraction.

In some examples, when the jobs all include high-availability jobs or low-availability jobs, the computer processor determines a fraction spindle quota increase and a fraction spindle quota for reallocating the resource usage based on the fraction spindle quota increase or the fraction spindle quota. The system may further determine a low-availability scaled third load of the jobs on temporary resources available during the failure event based on the first and second loads of low-availability jobs. The computer processor further determines a fraction of high-avail ability spindle usage for reallocating the resource usage based on the fraction of high-availability spindle usage.

In some implementations, the computer processor determines an increase factor of low-availability job usage and determines a total of low-availability usage per spindle for reallocating the resource usage based on the total of low-availability usage per spindle. The computer processor further determines a total spindle usage to reallocate the resource usage based on the total spindle usage.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5A is a schematic view of exemplary resources and the load that the resources can handle when all the resources are available.

FIG. 5B is a schematic view of the exemplary resources of FIG. 5A and the load associated with the available portion of the resources that are handled when a portion of the resources are not available.

FIG. 5C is a schematic view of the exemplary resources of FIG. 5A and the adjusted load associated with the available portion of the resources that are handled when a portion of the resources are not available.

FIG. 5D is a schematic view of the exemplary resources of FIG. 5C as applied to Reed-Solomon coding.

FIG. 5E is a schematic view of the exemplary resources of FIG. 5C as applied to Nested coding.

FIG. 6A is a schematic view of exemplary resources receiving high-availability jobs and low-availability jobs when all the resources are available.

FIG. 6B is a schematic view of the exemplary resources receiving high-availability jobs and low-availability jobs.

Like reference symbols in the various drawings indicate like elements.

DETAILED DESCRIPTION

Figure 1A:
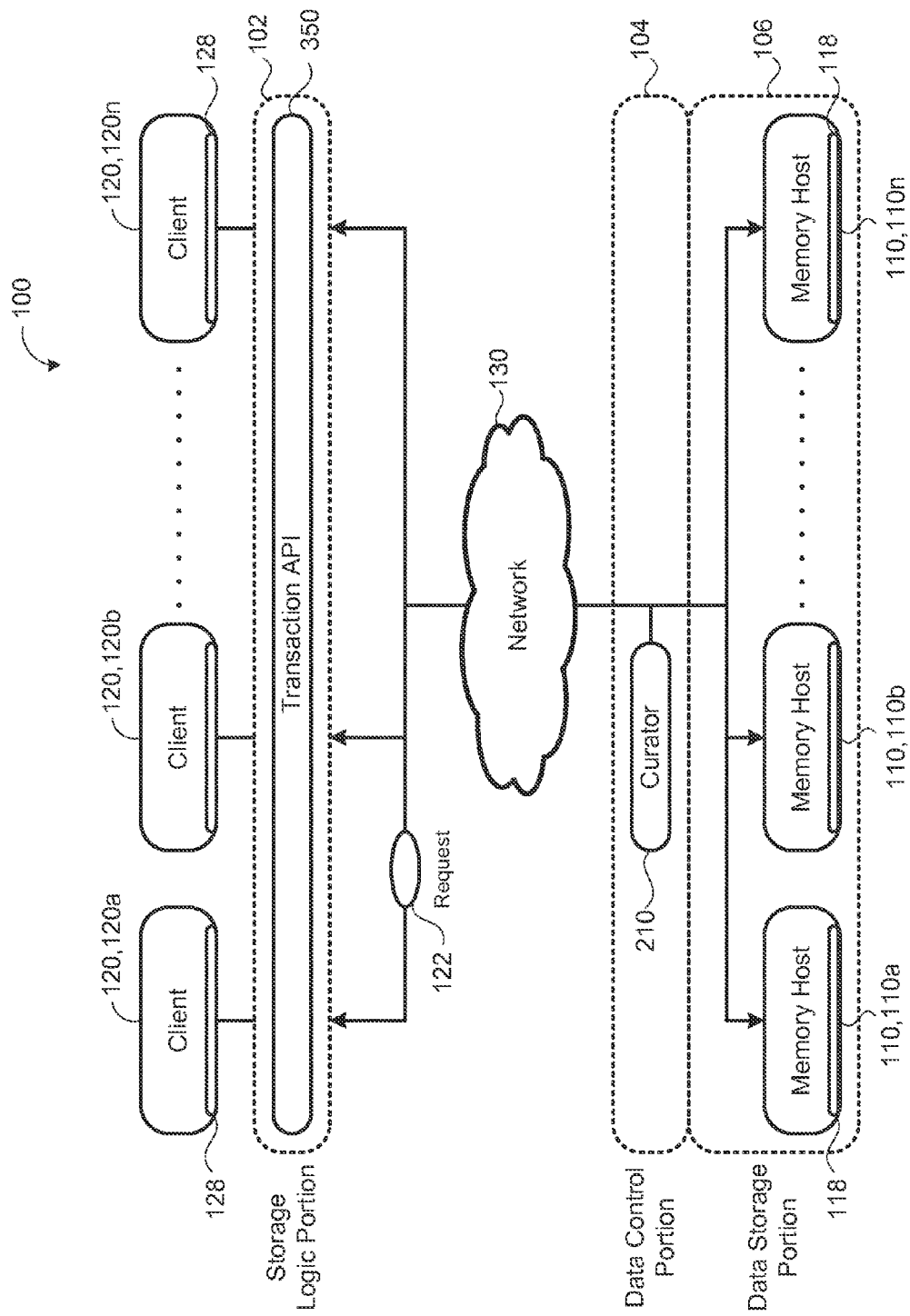
FIG. 1A is a schematic view of an exemplary distributed storage system.
Figure 1B:
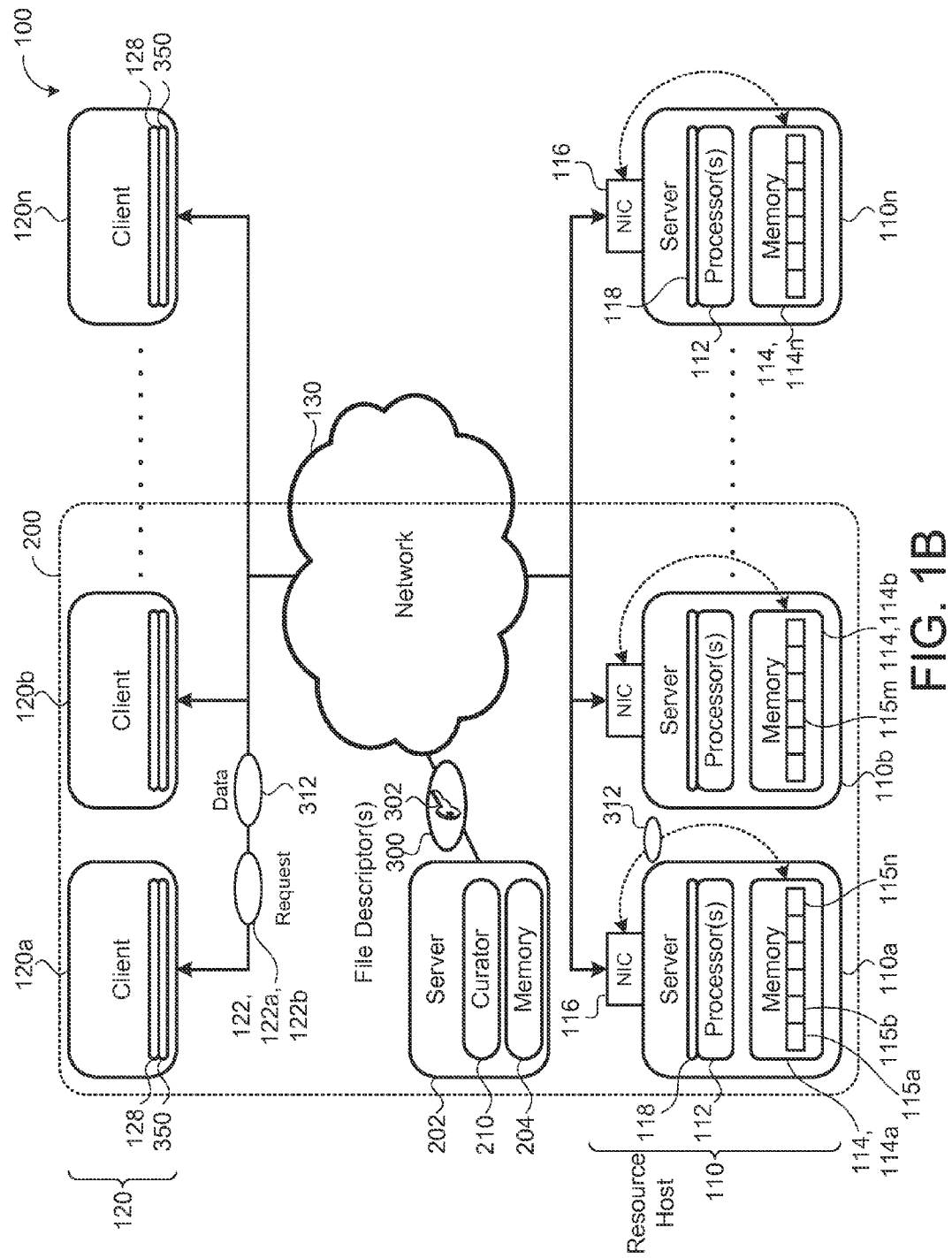
FIG. 1B is a schematic view of an exemplary distributed storage system having a cell of resource hosts managed by a curator.

Referring to FIGS. 1A-1B, in some implementations, a distributed storage system 100 includes loosely coupled resource hosts 110, 110a-n (e.g., computers or servers), each having a computing resource 112 (e.g., one or more processors or central processing units (CPUs)) in communication with storage resources 114 (e.g., memory, flash memory, dynamic random access memory (DRAM), phase change memory (PCM), and/or disks having spindles) that may be used for caching data 312. A storage abstraction (e.g., key/value store or file system) overlain on the storage resources 114 allows scalable use of the storage resources 114 by one or more clients 120, 120a-n. The clients 120 may communicate with the resource hosts 110 through a network 130 (e.g., via RPC).

The distributed storage system 100 may include multiple layers of redundancy where data 312 is replicated and/or encoded and stored in multiple data centers. Data centers (not shown) house computer systems and their associated components, such as telecommunications and storage systems 100. Data centers usually include backup power supplies, redundant communications connections, environmental controls (to maintain a constant temperature), and security devices.

Data centers may be large industrial scale operations that use a great amount of electricity (e.g., as much as a small town). Data centers may be located in different geographical locations (e.g., different cities, different countries, and different continents). In some examples, the data centers, or portions thereof, requires maintenance (e.g., due to a power outage or disconnecting a portion of the storage system 100 for replacing parts, or a system failure, or a combination thereof). The data 312 stored in these data centers, and in particular, the distributed storage system 100 may be unavailable to users/clients 120 during the maintenance period resulting in the impairment or halt of a user's operations. Therefore, it is desirable to provide a distributed storage system 100 capable of efficiently using the storage resources 114 of the resource hosts 110 during a maintenance and/or certain data center hardware/software failures without moving the data 312 in advance of such a maintenance or failure. The system 100 may adjust a load of the available resources, and jobs of the adjusted load may be executed in a predefined order, such as high-availability jobs before the low-availability jobs.

In some implementations, the distributed storage system 100 is "single-sided," eliminating the need for any server jobs for responding to remote procedure calls (RPC) from clients 120 to store or retrieve data 312 on their corresponding resource hosts 110 and may rely on specialized hardware to process remote requests 122 instead. "Single-sided" refers to the method by which most of the request processing on the resource hosts 110 may be done in hardware rather than by software executed on CPUs 112 of the resource hosts 110. Rather than having a processor 112 of a resource host 110 (e.g., a server) execute a server process 118 that exports access of the corresponding storage resource 114 (e.g., non-transitory memory) to client processes 128 executing on the clients 120, the clients 120 may directly access the storage resource 114 through a network interface controller (NIC) 116 of the resource host 110. In other words, a client process 128 executing on a client 120 may directly interface with one or more storage resources 114 without requiring execution of a of any server processes 118 executing on the computing resources 112. This single-sided distributed storage architecture offers relatively high-throughput and low latency, since clients 120 can access the storage resources 114 without interfacing with the computing resources 112 of the resource hosts 110. This has the effect of decoupling the requirements for storage 114 and CPU cycles that typical two-sided distributed storage systems 100 carry. The single-sided distributed storage system 100 can utilize remote storage resources 114 regardless of whether there are spare CPU cycles on that resource host 110; furthermore, since single-sided operations do not contend for server CPU 112 resources, a single-sided system can serve cache requests 122 with very predictable, low latency, even when resource hosts 110 are running at high CPU utilization. Thus, the single-sided distributed storage system 100 allows higher utilization of both cluster storage 114 and CPU 112 resources than traditional two-sided systems, while delivering predictable, low latency.

In some implementations, the distributed storage system 100 includes a storage logic portion 102, (e.g., encoding system 102), a data control portion 104, and a data storage portion 106. The storage logic portion 102 may include a transaction application programming interface (API) 350 (e.g., a single-sided transactional system client library) that is responsible for accessing the underlying data 312, for example, via RPC or single-sided operations. The data control portion 104 may manage allocation and access to storage resources 114 with tasks, such as allocating storage resources 114, registering storage resources 114 with the corresponding network interface controller 116, setting up connections between the client(s) 120 and the resource hosts 110, handling errors in case of machine failures, etc. The data storage portion 106 may include the loosely coupled resource hosts 110, 110a-n.

The distributed storage system 100 may store data 312 in dynamic random access memory (DRAM) 114 and serve the data 312 from the remote hosts 110 via remote direct memory access (RDMA)-capable network interface controllers 116. A network interface controller 116 (also known as a network interface card, network adapter, or LAN adapter) may be a computer hardware component that connects a computing resource 112 to the network 130. Both the resource hosts 110a-n and the client 120 may each have a network interface controller 116 for network communications. A host process 118 executing on the computing processor 112 of the resource host 110 registers a set of remote direct memory accessible regions 115a-n of the memory 114 with the network interface controller 116. The host process 118 may register the remote direct memory accessible regions 115a-n of the memory 114 with a permission of read-only or read/write. The network interface controller 116 of the resource host 110 creates a client key 302 for each registered memory region 115a-n.

The single-sided operations performed by the network interface controllers 116 may be limited to simple reads, writes, and compare-and-swap operations, none of which may be sophisticated enough to act as a drop-in replacement for the software logic implemented by a traditional cache server job to carry out cache requests and manage cache policies. The transaction API 350 translates commands, such as look-up or insert data commands, into sequences of primitive network interface controller operations. The transaction API 350 interfaces with the data control and data storage portions 104, 106 of the distributed storage system 100.

The distributed storage system 100 may include a co-located software process to register memory 114 for remote access with the network interface controllers 116 and set up connections with client processes 128. Once the connections are set up, client processes 128 can access the registered memory 114 via engines in the hardware of the network interface controllers 116 without any involvement from software on the local CPUs 112 of the corresponding resource hosts 110.

Referring to FIG. 1B, in some implementations, the distributed storage system 100 includes multiple cells 200, each cell 200 including resource hosts 110 and a curator 210 in communication with the resource hosts 110. The curator 210 (e.g., process) may execute on a computing processor 202 (e.g., server having a non-transitory memory 204) connected to the network 130 and manage the data storage (e.g., manage a file system stored on the resource hosts 110), control data placements, and/or initiate data recovery. Moreover, the curator 210 may track an existence and storage location of data 312 on the resource hosts 110. Redundant curators 210 are possible. In some implementations, the curator(s) 210 track the striping of data 312 across multiple resource hosts 110 and the existence and/or location of multiple copies of a given stripe for redundancy and/or performance. In computer data storage, data striping is the technique of segmenting logically sequential data 312, such as a file 310 (FIG. 2), in a way that accesses of sequential segments are made to different physical storage devices 114 (e.g., cells 200 and/or resource hosts 110). Striping is useful when a processing device requests access to data 312 more quickly than a storage device 114 can provide access. By performing segment accesses on multiple devices, multiple segments can be accessed concurrently.

This provides more data access throughput, which avoids causing the processor to idly wait for data accesses.

In some implementations, the transaction API 350 interfaces between a client 120 (e.g., with the client process 128) and the curator 210. In some examples, the client 120 communicates with the curator 210 through one or more remote procedure calls (RPC). In response to a client request 122, the transaction API 350 may find the storage location of certain data 312 on resource host(s) 110 and obtain a key 302 that allows access to the data 312. The transaction API 350 communicates directly with the appropriate resource hosts 110 (via the network interface controllers 116) to read or write the data 312 (e.g., using remote direct memory access). In the case that a resource host 110 is non-operational, or the data 312 was moved to a different resource host 110, the client request 122 fails, prompting the client 120 to re-query the curator 210.

Figure 2:
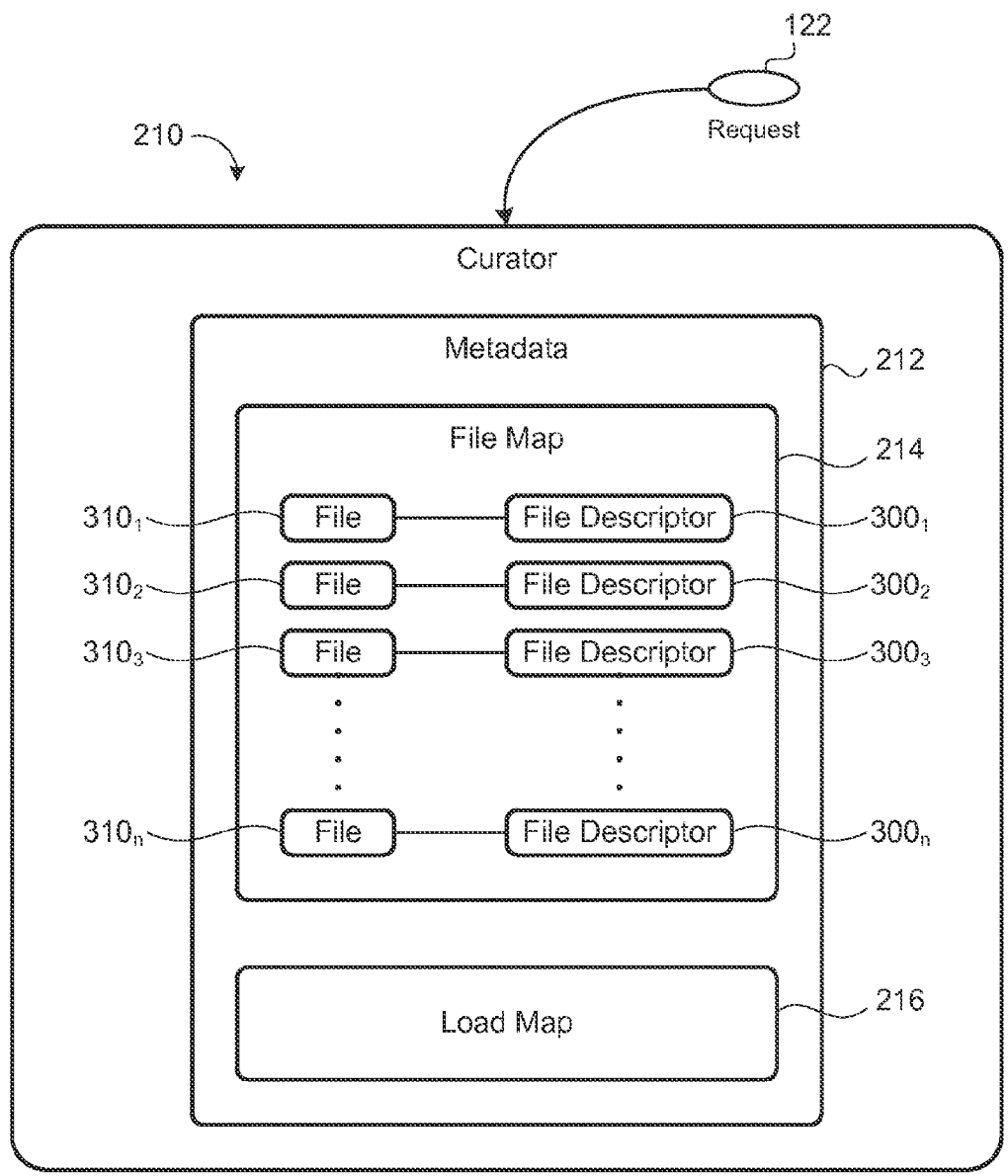
FIG. 2 is a schematic view of an exemplary curator for a distributed storage system.

Referring to FIG. 2, in some implementations, the curator 210 stores and manages file system metadata 212. The metadata 212 may include a file map 214 that maps files $310_{1-n}$ to file descriptors $300_{1-n}$. The curator 210 may examine and modify the representation of its persistent metadata 212. The curator 210 may use three different access patterns for the metadata 212: read-only; file transactions; and stripe transactions.

Figure 3A:
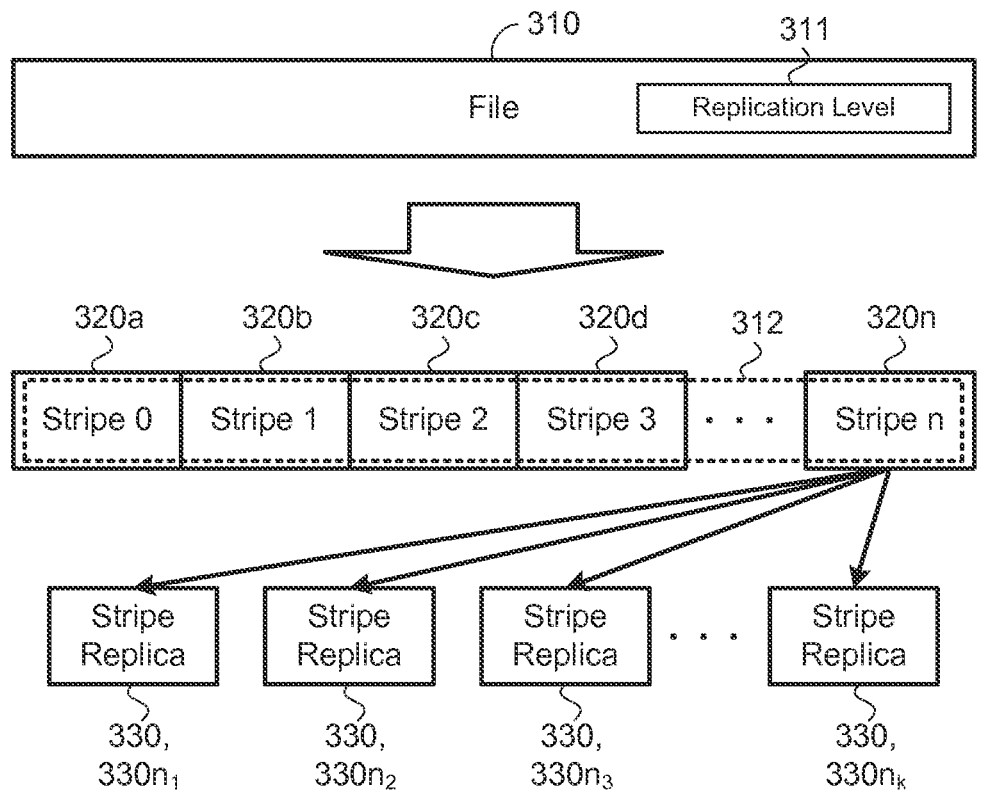
FIG. 3A is a schematic view of an exemplary file split into replicated stripes.
Figure 3B:
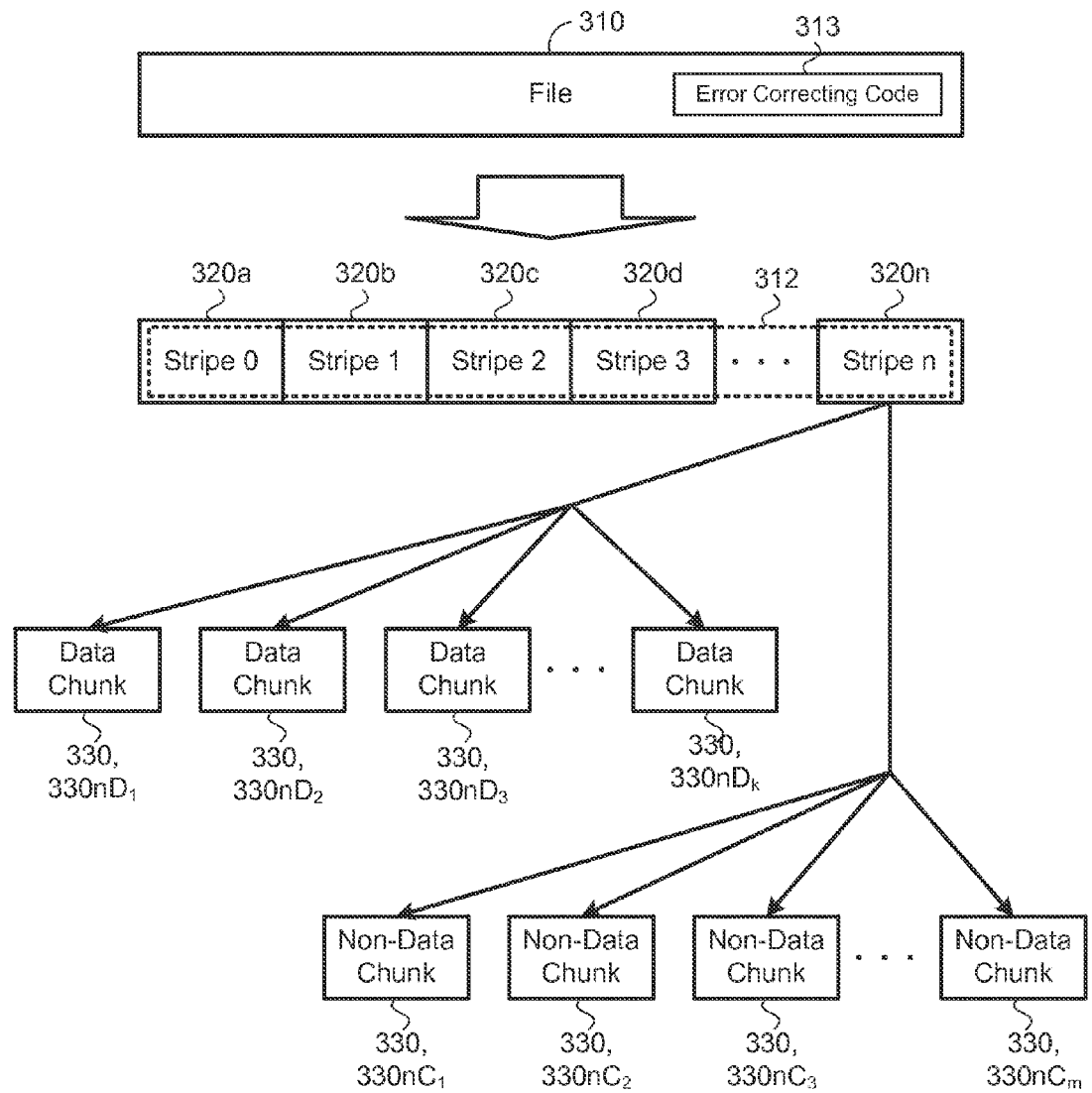
FIG. 3B is a schematic view of an exemplary file split into data chunks and non-data chunks.

Referring to FIGS. 2, 3A and 3B, data 312 may be one or more files 310, where each file 310 has a specified replication level 311 and/or error-correcting code 313. The curator 210 may divide each file 310 into a collection of stripes 320a-n, with each stripe 320a-n being replicated or encoded independently from the remaining stripes 320a-n. For a replicated file 310 (FIG. 3A), each stripe 320a-n is a single logical chunk that the curator 210 replicates as stripe replicas 330 and stores on multiple storage resources 114. In that scenario, a stripe replica 330n is also referred to as a chunk 330n. For an encoded file 310 (FIG. 3B), each stripe 320a-n consists of multiple data chunks $330nD_k$ and non-data chunks 330nC (e.g., code chunks) that the curator 210 places on multiple storage resources 114, where the collection of data chunks 330nD and non-data chunks 330nC forms a single code word. In general, the curator 210 may place each stripe 320a-n on storage resources 114 independently of how the other stripes 320a-n in the file 310 are placed on the storage resources 114. The error-correcting code 313 adds redundant data, or parity data to a file 310, so that the file 310 can later be recovered by a receiver even when a number of errors (tip to the capability of the code being used) were introduced. The error-correcting code 313 is used to maintain data 312 integrity in storage devices, to reconstruct data 312 for performance (latency), or to more quickly drain machines.

Referring back to FIG. 2, in some implementations, file descriptors $300_{1-n}$ stored by the curator 210 contain metadata 212, such as the file map 214, which maps the stripes 320a-n to stripe replicas 330n or to data chunks 330nD and non-data chunks 330nC, as appropriate, stored on the memory hosts 110. To open a file 310, a client 120 sends a request 122 to the curator 210, which returns a file descriptor 300. The client 120 uses the file descriptor 300 to translate file chunk offsets to remote memory locations 115a-n. The file descriptor 300 may include a client key 302 (e.g., a 32-bit key) that is unique to a chunk 330 on a memory host 110 and is used to RDMA-read that chunk 330. After the client 120 loads the file descriptor 300, the client 120 may access the data 312 of a file 310 via RDMA or another data retrieval method.

The curator 210 may maintain status information for all memory hosts 110 that are part of the cell 200. The status information may include capacity, free space, load on the memory host 110, latency of the memory host 110 from a client's point of view, and a current state. The curator 210 may obtain this information by querying the memory hosts 110 in the cell 200 directly and/or by querying a client 120 to gather latency statistics from a client's point of view. In some examples, the curator 210 uses the memory host status information to make rebalancing, draining, recovery decisions, and allocation decisions.

The curator(s) 210 may allocate chunks 330 in order to handle client requests 122 for more storage space in a file 310 and for rebalancing and recovery. In some examples, the processor 202 replicates chunks 330 among the storage devices 114 differently than distributing the data chunks 330nD and the code chunks 330nC among the storage devices 114. The curator 210 may maintain a load map 216 of memory host load and liveliness. In some implementations, the curator 210 allocates a chunk 330 by generating a list of candidate memory hosts 110 and sends an allocate chunk request to each of the candidate memory hosts 110. If the memory host 110 is overloaded or has no available space, the memory host 110 can deny the request 122. In this case, the curator 210 selects a different memory host 110. Each curator 210 may continuously scan its designated portion of the file namespace, examining all the metadata 212 every minute or so. The curator 210 may use the tile scan to check the integrity of the metadata 212, determine work that needs to be performed, and/or to generate statistics. The file scan may operate concurrently with other operations of the curator 210. The scan itself may not modify the metadata 212, but schedules work to be done by other components of the system and computes statistics.

Referring to FIG. 3B, each stripe 320 is divided into data chunks 330nD and non-data chunks 330nC based on an encoding level, e.g., Reed-Solomon Codes (FIG. 3C), nested codes (FIGS. 3D-3H), or other erasure coding. The non-data chunks 330nC may be code chunks 330nC (e.g., for Reed Solomon codes). In other examples, the non-data chunks 330nC may be code-check chunks 330nCC, word-check chunks 330nWC, and code-check-word-check chunks 330nCCWC (for nested coding).

A data chunk 330nD is a specified amount of data 312. In some implementations, a data chunk 330n D is a contiguous portion of data 312 from a file 310. In other implementations, a data chunk 330nD is one or more non-contiguous portions of data 312 from a file 310. For example, a data chunk 330nD can be 256 bytes or other units of data 312.

A damaged chunk 330 (e.g., data chunk 330nD or non-data chunk 330nC) is a chunk 330 containing one or more errors. Typically, a damaged chunk 330 is identified using an error detecting code 313. For example, a damaged chunk 330 can be completely erased (e.g., if the chunk 330 was stored in a hard drive destroyed in a hurricane), or a damaged chunk 330 can have a single bit flipped. A healthy chunk 330 is a chunk 330 that is not damaged. A damaged chunk 330 can be damaged intentionally, for example, where a particular resource host 110 is shut down for maintenance. A damaged chunk 330 may be a missing or unavailable chunk 330. In that case, damaged chunks 330 can be identified by identifying chunks 330 that are stored at resource hosts 110 that are being shut down. In some implementations, damaged chunks 330 may be recovered using healthy chunks 330. Damaged chunks 330 (e.g., data chunks 330nD or non-data chunks 330nC) may be damaged due to various reasons. Damaged chunks 330 within a stripe 320 may be recovered from the healthy chunks 330. The non-data chunks 330nC of a file 310 include an error-correcting code chunk 313. The error-correcting code chunks 313 include a chunk 330 of data 312 based on one or more data-chunks 330nD. In some implementations, each code chunk 330nC is the same specified size (e.g., 256 bytes) as the data chunks 330nD. The code chunks 330nC are generated using an error-correcting code 313, e.g., a Maximal Distance Separable (MDS) code. Examples of MDS codes include Reed-Solomon codes. Various techniques can be used to generate the code chunks 330nC. In general, any error-correcting code 313 can be used that can reconstruct d data chunks 330nD from any set of d unique, healthy chunks 330 (either data chunks 330nD or code chunks 330nC).

A codeword is a set of data chunks 330nD and code chunks 330nC based on those data chunks 330nD. If an MDS code is used to generate a codeword containing d data chunks 330nD and c code chunks 330nC, then all of the chunks 330 (data or code) can be reconstructed as long as any healthy chunks 330 (data or code) are available from the codeword.

Figure 3C:
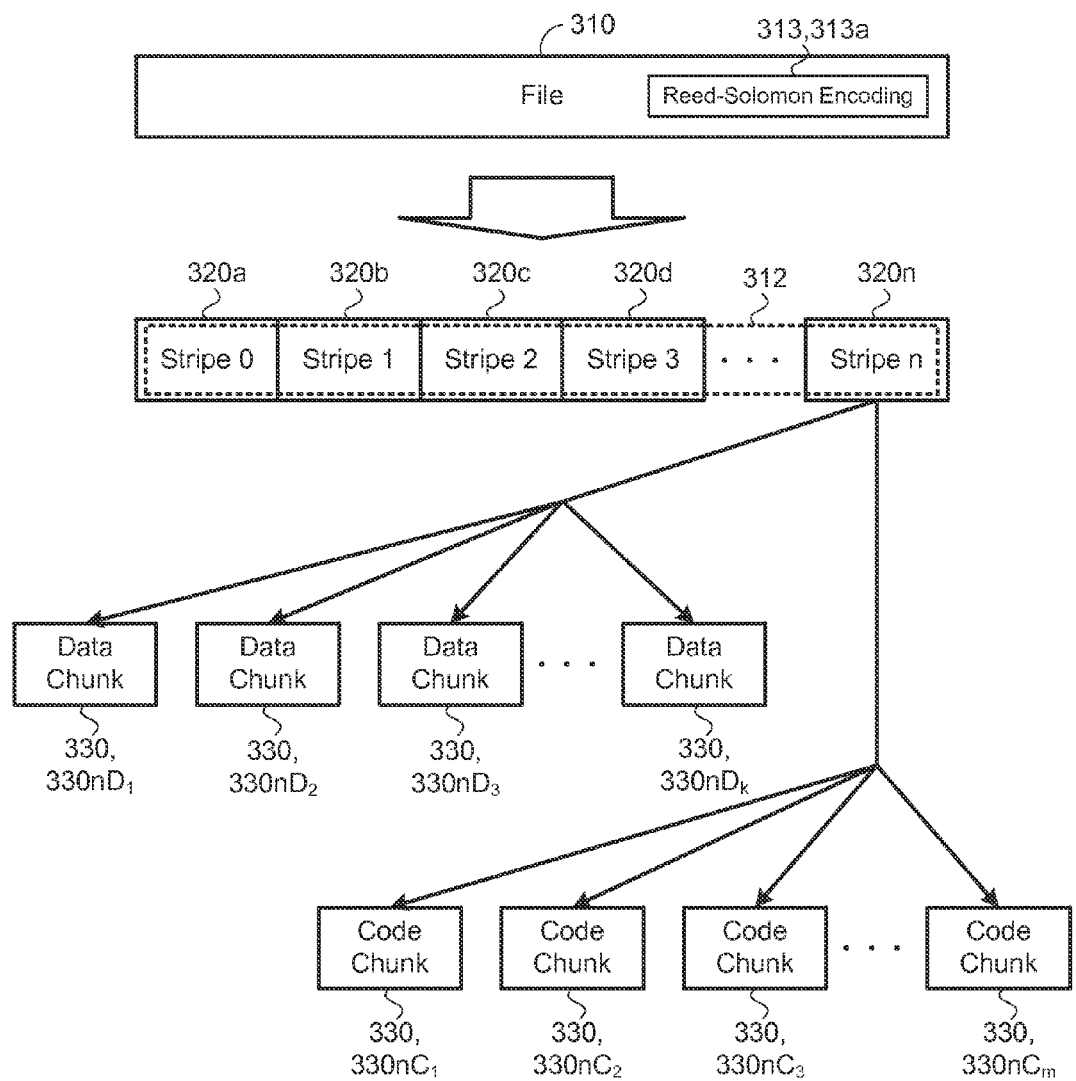
FIG. 3C is a schematic view of an exemplary Reed-Solomon coding technique.
Figure 3D:
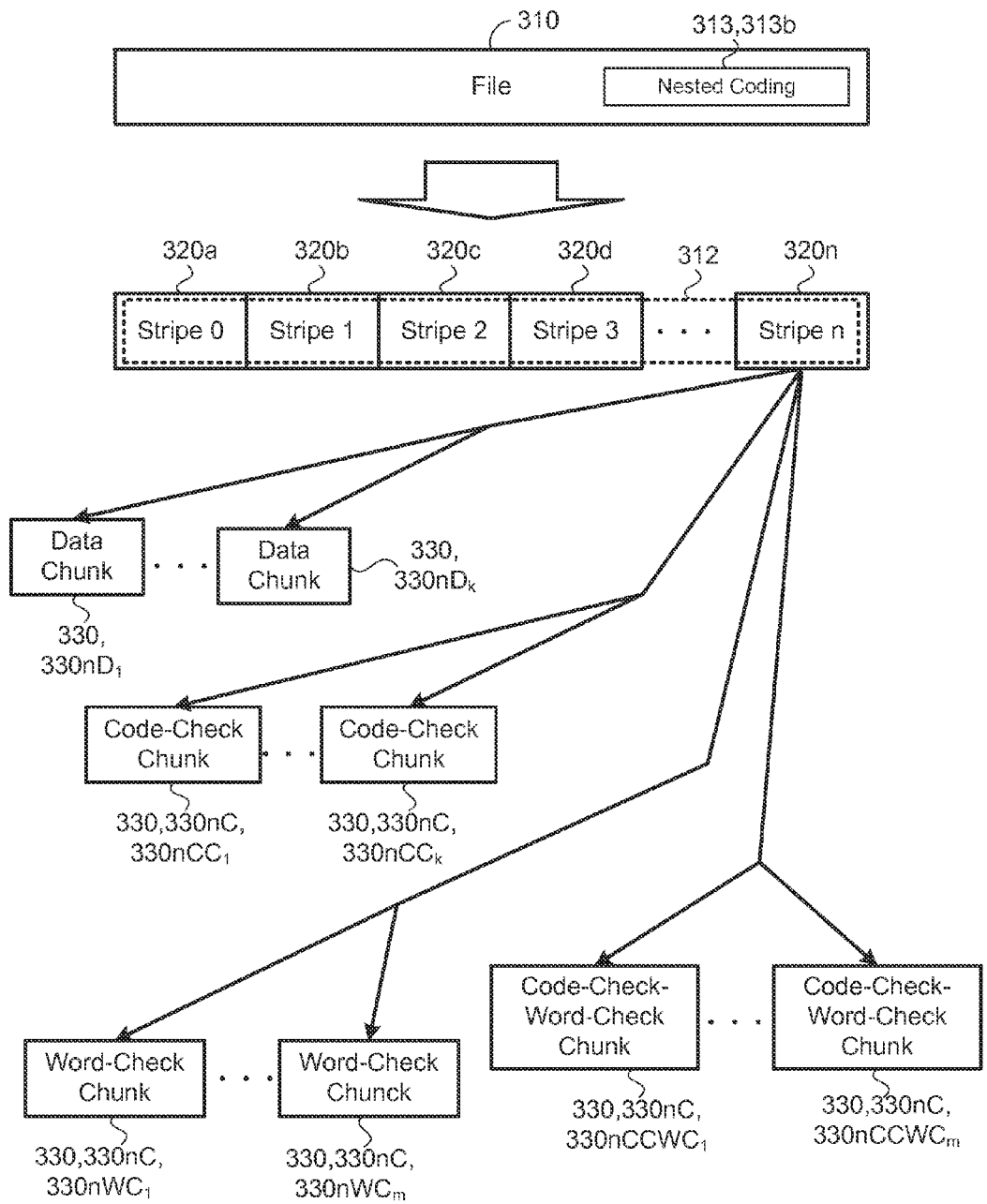
FIGS. 3D-3G are schematic views of exemplary nested coding techniques.

FIG. 3C shows a Reed-Solomon encoding 313a as the error-correcting code chunks 313. Each stripe 320 is divided into chunks 330 stored on multiple storage resources 114. The chunks 330 may be data chunks 330nD or code chunks 330nC, which together form a single code word. The data chunks 330nD include the actual data 312; while the code chunks 330nC are for parity to determine if the file 310 is intact. The Reed-Solomon encoding 313a allows for the loss of up to the total number of code chunks 330nC where the stripe 310 may still be reconstructed from the data chunk 330nD). Therefore, each stripe 320 of a file 310 consists of multiple data chunks 330nD and code chunks 330nC that the curator 210 places on multiple storage resources 114, where the collection of data chunks 330nD and code chunks 330nC forms a single code word. In general, the curator 210 may place each stripe 320 on storage resources 114 independently of how the other stripes 320 in the file 310 are placed on storage resources 114. The Reed-Solomon Encoding 313a adds redundant data 312, or parity data 312 to a file 310, so that the file 310 can later be recovered by a receiver even when a number of errors (up to the capability of the code being used) were introduced. Reed-Solomon Encoding 313a is used to maintain data integrity in resource hosts 110, to reconstruct data 312 for performance (latency), or to more quickly drain machines.

Referring to FIGS. 3D-3H, in nested coding 313b techniques, an encoded data block 316 includes a data block 316 having data chunks 330nD and error-correcting code chunks 313 (i.e., non-data chunks 330nC) that is being stored is viewed as forming a two dimensional R×C array. There are X code chunks 330nC for each column C (called "code-check chunks 330nCC") that can be used to reconstruct X or fewer damaged chunks 330 per column. There are Y code chunks 330nC (called "word-check chunks 330nWC") for the entire 2-D array. When there are more than X damaged chunks 330 in one or more columns C, the word-check chunks 330nWC are used in addition to other healthy chunks 330 to reconstruct damaged chunks 330. Although some examples described in this specification illustrate encoded data blocks 314 (i.e., data block 316 and code chunks 330nC (i.e., non-data chunks 330nC)) as forming a two dimensional array, it is possible for coding techniques to create encoded data blocks 314 configured differently. For instance, different columns can have different numbers of code-check chunks 330nCC (i.e., the code-check chunk 330nCC), and columns C that contain word-check chunks 330nWC can have different numbers of rows than columns that contain data chunks 330nD and code-check chunks 330nC.

The codes 330nC can be used to store data 312 across resource hosts 110 by allocating each column C of data chunks 330nD to a data center. Each chunk 330 within the columns C can be allocated to a resource host 110 within a data center. Then, if X or fewer chunks 330 are lost at a data center, the chunks 330 can be reconstructed using only intra-data center communication (e.g., so no other data centers have to provide data 312 in performing reconstruction). If more than X chunks 330 are lost in one or more data centers, then the Y word-check chunks 330nWC are used to attempt reconstruction. Thus, inter-data center communication (which may be more expensive, e.g., slower than intra-data center communication) is only needed when more than X chunks 330 are damaged within a single data center.

The codes can also be used within a single data center. Instead of allocating different columns C to different data centers, the encoding system 102 stores all of the columns at a single data center. The data chunks 330nD) and code chunks 330nC can be stored at distinct resource hosts 110 within that data center. This is useful, for example, where reading data 312 from resource hosts 110 during reconstruction is expensive (e.g., time consuming), so that the encoding system 102 can read fewer chunks 330 during reconstruction than would be needed using conventional coding techniques. Small numbers of damaged chunks 330 can be reconstructed by reading small numbers of other chunks 330 (code-check chunks 330nCC and other data chunks 330nD in the column C), and large numbers of damaged chunks 330 can be reconstructed using the word-check chunks 330nWC when needed.

Referring to FIGS. 3D-3H, in some implementations, a nested coding 313b technique shows data chunks 330nD and code chunks 330nC that form a codeword. As shown, the nested coding 313b technique is a two dimensional (2D) nested coding 313b technique, but a three dimensional (3D) nested coding 313b technique may also be applied. A 2D nested code 313b is created from an arbitrary linear MDS code in systematic form. Word-check chunks 330nWC that are based on a data block 316 are partitioned into two groups, the first group including X code chunks 330nC and the second group including N code chunks 330nC. The block of data 312 is viewed as forming an array of columns C, and X code chunks 330nC in the first group are used to create X column chunks 330 per column by "splitting" them into separate components per column ("split" code-check chunks 330nCC). The N code chunks 330nC in the second group form word-check chunks 330nWC.

Figure 3E:
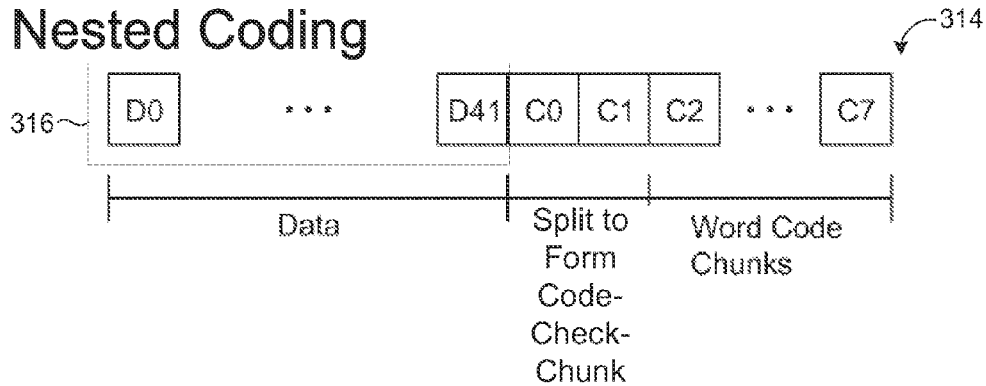

For example, FIG. 3E shows data block (D0-D41) 316 where D0-D41 are data chunks 330nD and code chunks (C0-C7) 330nC that are based on the data block (D0-D41)316. The data chunks (D0-D41) 330nD and the code chunks (C0-C7) 330nC form a codeword. The code chunks 330nC are partitioned into a first group that includes C0-C1 and a second group that includes C2-C7. C0-C1 are split to form split code-check chunks 330nCC. C2-C7 are used as word-check chunks 330nWC.

Figure 3F:
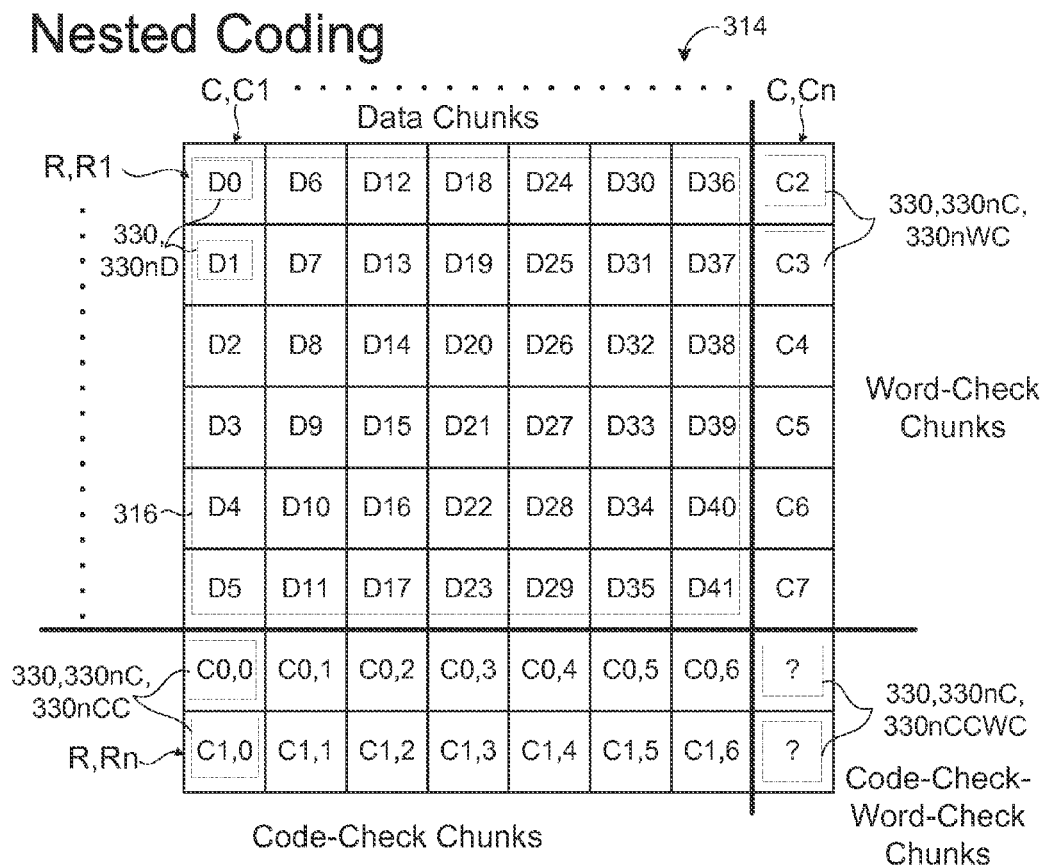

Referring to FIG. 3F, a resulting encoded data block 314 that includes the data block (D0-D41) 316 and additional code chunks 330nC (split code-check chunks 330nCC and word-check chunks 330nWC) is shown. To generate a split code-check chunk 330nCC corresponding to C0 for column j (denoted C0,j), C0 is generated as though all the data chunks 330nD not in column j have the value zero. That is, C0,j has the value that would result from performing the operations to generate C0 using the full data block 316 of data chunks 330nD but instead using only the column j, with all of the other columns zeroed out. For example, if a generator matrix would be used to generate C0 for the full data block 316, then the generator matrix can be modified to generate C0,j so that it has the value that would result from using the original generator matrix and applying that original generator matrix to the data block 316 with data chunks 330nD in columns other than column j zeroed out.

The split code-check chunks 330nCC for C1,j for each column C are generated similarly, but using C1 instead of C0. As a result, C0 is a linear combination of C0,0-C0,6 and C1 is a linear Combination of C1,0-C1,6. That is, $$C0 = \Sigma_{j=0}^{6} C0,j; \qquad (1)$$

and $$C1 = \Sigma_{j=0}^{6} C1,j. \qquad (2)$$

The chunks 330 denoted as "?" in FIG. 3F can be generated in various ways, e.g., as described further below with reference to FIG. 3G.

In the example of FIGS. 3E and 3F, the resulting encoded data block 316 includes 42 data chunks 330nD and 8 code chunks 330nC. Referring to the original code used to create the encoded block 314, the code chunks 330nC belong to one of two groups as described above, X=2 of which are in the first group and N=6 of which are in the second group. Whenever there are two or fewer (X or fewer) damaged chunks 330 within one of the first seven columns, the damaged chunks 330 can be corrected using the healthy chunks 330 of the columns C and the split code-check chunks 330nCC for the column C. To see this, let j denote the column C including the two or fewer damaged chunks 330 and consider the codeword obtained by zeroing-out all the data chunks 330nD from columns C other than j. In that codeword, C0=C0,j and C1=C1,j. As a result, the two or fewer damaged chunks 330 in other columns as containing all-zero data chunks 330nD, and by viewing the word-check chunks 330nWC as being damaged.

In the example shown in FIG. 3F, the word-check chunks 330nWC fully fill an entire column C (the column to the right). 2D nested codes 313b can be created with an arbitrary number of columns C of word-check chunks 330nWC. The columns C of word-check chunks 330nWC can have the same number of rows R as the columns of data chunks 330nD or different numbers of rows R, and the columns C of word-check chunks 330nWC can have different numbers of rows R from each other. Columns C of word-check chunks 330nWC can, but do not have to, have code-check chunks 330nCC, i.e., code-check-word-check chunks 330nCCWC. Increasing the number of word-check chunks 330nWC improves the reliability of the stored data 312 but uses more storage at resource hosts 110. In general, for nested codes 313b, columns C include either data chunks 330nD or word-check chunks 330nWC and not both.

In general, a 2D) nested code 313b with X split code-check chunks 330nCC per column C and N word-check chunks 330nWC can be used to reconstruct X damaged chunks 330 per column C (in those columns that include data chunks 330nD) while performing only intra-columns communication (which is typically, e.g., intra-data center communication). In reconstructing multiple damaged chunks 330 within the block, those damaged chunks 330 are typically reconstructed first because intra-column communication is less expensive than inter-column communication, but other damaged chunks 330 may remain. If, after reconstructing damaged chunks 330 within columns, (N+X) or fewer other chunks 330 are still damaged (because they were not able to be reconstructed using intra-column communication), those other damaged chunks 330 can be reconstructed using the word-check chunks 330nWC and the split code-check chunks 330nCC. The word-check chunks 330nWC in the first group (C0 and C1) can be determined from the split code-check chunks 330nCC, e.g., using the formula $Ci = \Sigma_{j=0}^{6} C\,i,j$, even though those word-check chunks 330nWC are not explicitly stored.

To see this, let Z denote the number of word-check chunks 330nWC that are damaged and let Y denote the number of word-check chunks 330nWC in the first group that cannot be reconstructed from their corresponding split code-check chunks 330nCC according to the formula $Ci = \Sigma_{j=0}^{6} C\,0,j$ to split code-check chunks 330nCC being damaged. Using that formula, X-Y word-check chunks 330nWC from the first group can be determined, resulting in a codeword (e.g., the one shown in FIG. 3E) with Y damaged word-check chunks 330nWC in the first group and Z damaged word-check chunks 330nWC in the second group. Because there are at most N+X total damaged chunks 330, there are at most N+X−Y−Z damaged data chunks 330nD. Thus, it is possible to use the resulting codeword to reconstruct all of the damaged chunks 330, as it includes at most N+X−Y−Z+Y+Z=N+X damaged chunks 330.

Figure 3G:
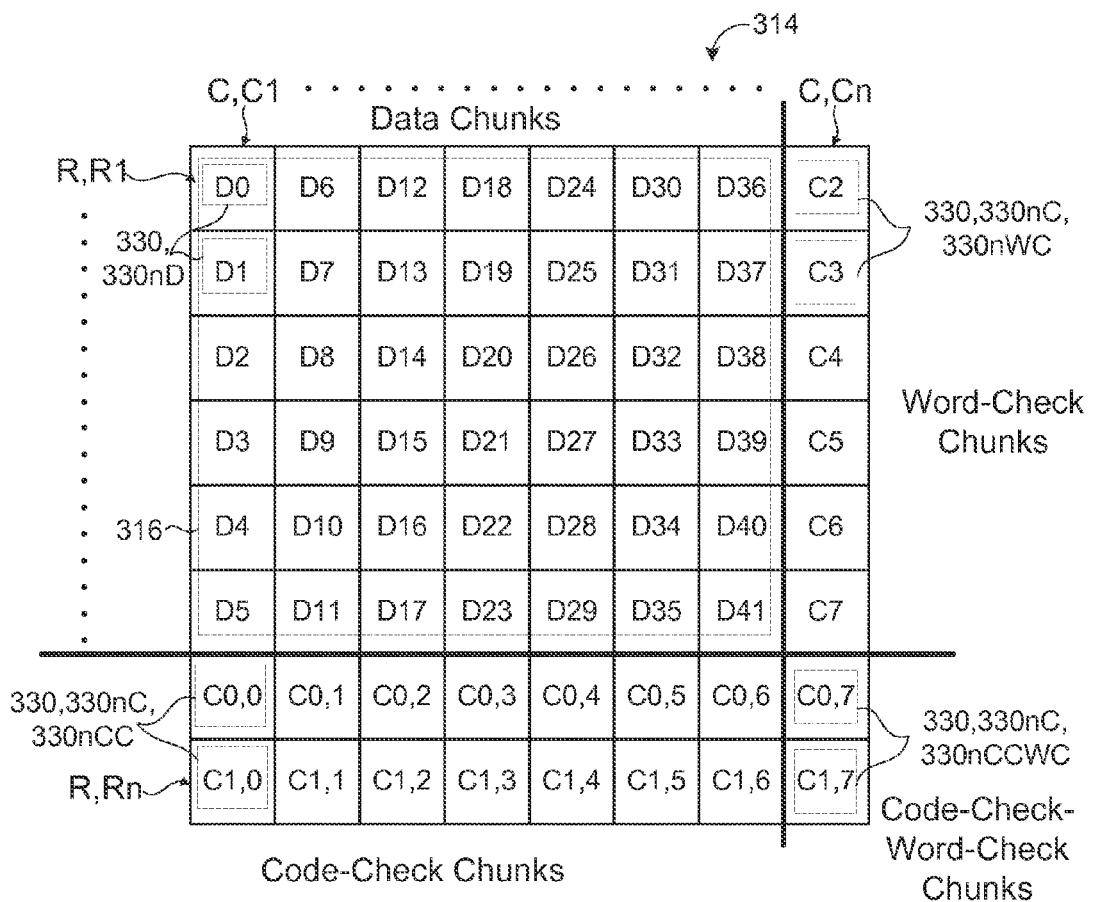

Referring to FIG. 3G, in some implementations, the resulting encoded block 314 includes code-check chunks 330nCC for the word-check chunks 330nWC (i.e., code-check-word-check chunks 330nCCWC). Compared to the encoded block 314 of FIG. 3F, the block of FIG. 3G includes the code-check chunks C0,7 and C1,7 330nCC in place of the locations marked with "?" in FIG. 3F. This is one way to provide for reconstructing damaged word-check chunks 330nWC without relying on inter-column communication. The code-check chunks C0,7 and C1,7 330nCC can be generated in various ways. For example, those code-check chunks 330nCC can be generated based on C2-C7 in the same manner that C0,0 and C1,0 are generated based on D0-D5. The resulting encoded block of FIG. 3G (using the example nested code 313b) can be used to reconstruct up to eight damaged chunks 330 after performing intra-column reconstruction. Code-check chunks 330nC can be added for any number of columns that include word-check chunks 330nWC.

Figure 3H:
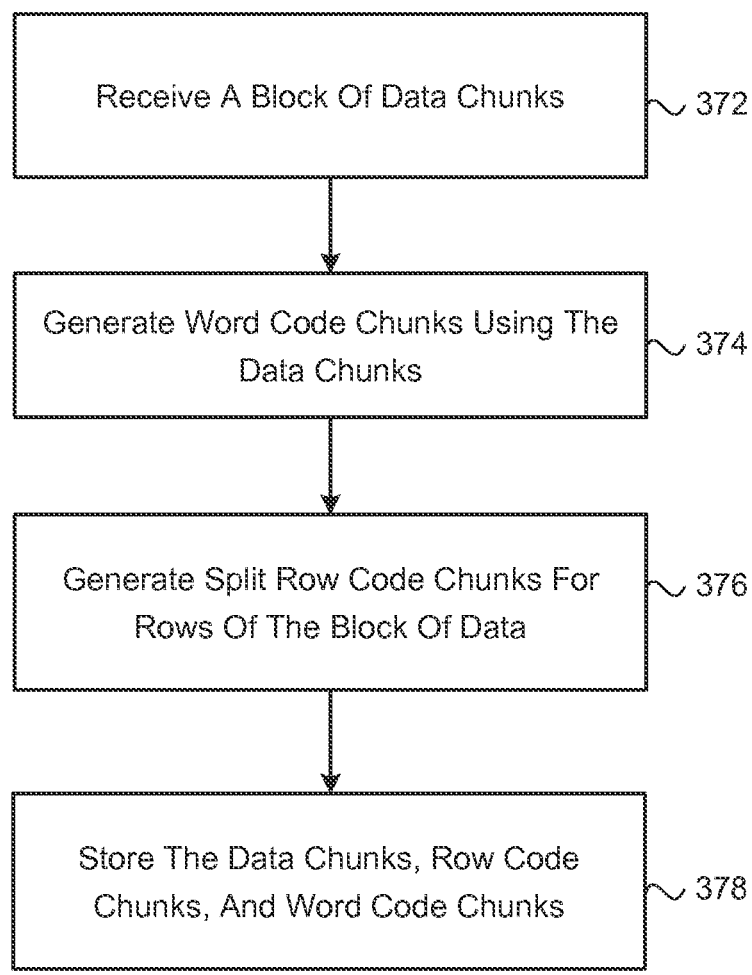
FIG. 3H is an exemplary arrangement of operations for storing data using nested coding techniques.

Referring to FIG. 3H, in some implementations, the curator 210 distributes data 312 using a nested code 313b. The system 100 receives a data block 316 (step 372). The data block 316 can include $m_d * n_d$ data chunks 330nC, where $m_d$ is a number of data rows and $n_d$ is a number of data columns, and $m_d$ and $n_d$ are greater than or equal to one. The encoded block 314 includes m*n chunks 330 that include $m_d * n_d$, where n is the total number of rows R of data chunks 330nD and non-data chunks 330nC, and n is the number of columns C of data chunks 330nD and non-data chunks 330nC; in and n are greater than or equal to one. The system 100 generates one or more columns C of word-check chunks 330nWC using a first linear error-correcting code 313 in systematic form and the data chunks 330nD (step 374). The word-check chunks 330nWC and the data chunks 330nD of the same row R form a codeword. For each of $m_d$ row of data chunks 330nD, the system 100 generates one or more split code-check chunks 330nCC for the column C (step 376). The split code-check chunks 330nCC are generated so that a linear combination of n split code-check chunks 330nCC from different columns C forms a first word-check chunk 330nWC of a first codeword including the data chunks 330nD and the m word-check chunks 330nWC. The first word-check chunk 330nWC (and any other word-check chunks 330nWC resulting from a linear combination of split code-check chunks 330nCC from different columns C) forms a codeword with the data chunks 330nD and the word-check chunks 330nWC generated in step 374. For example, the split code-check chunks 330nCC for each columns C can be generated using a splitting error-correcting code 313 and the $m_d$ data chunks 330nD or the word-check chunks 330nWC, wherein the splitting error-correcting code 313 includes a splitting generator matrix that codes the same as a generator matrix for the first linear error-correcting code 313 applied to the data chunks 330nD with the data chunks 330nD zeroed-out for columns C other than the column C.

The system 100 stores the column C of data chunks 330nD and the split code-check chunks 330nCC and the word-check chunks 330nWC (step 378). In some implementations, the system 100 stores all the chunks 330 at a single group of resource hosts 110. In some other implementations, the system 100 allocates each column C to a distinct group of resource hosts 110. When the system 100 identifies one or more damaged chunks 330, the system 100 can reconstruct the damaged chunks 330 using the split code-check chunks 330nCC and the word-check chunks 330nWC. Typically, the system 100 attempts to reconstruct damaged chunks 330 using the split code-check chunks 330nCC and other data chunks in the same column C. If, after reconstructing damaged chunks 330 using only the split code-check chunks 330nCC, some damaged chunks 330 remain, the system 100 uses the word-check chunks 330nWC for reconstruction, including the word-check chunks 330nWC that can be determined by determining a linear combination of the split code-check chunks 330nCC. In some examples, when there are multiple losses, the system 100 uses any of the chunks 330 including data chunks 330nD.

The storage system 100 or portions thereof may undergo a system failure for a period of time. The data 312 distributed on the resource hosts 110 of the storage system 100 may not be available for users. For example, referring back to FIG. 1B, a resource host 110a may be undergoing maintenance or has a system failure; therefore, data 312 (e.g., stripe replicas 330n, data chunks 330nD and non-data chunks 330nC) stored on the resource host 110a may not be retrievable (i.e., the data 312 is inaccessible). In addition, the resource host 110a may take an extended period of time (e.g., a week) to be functional or for maintenance to be completed. Within the period during which the resource host 110a is not available, the storage system 100 may recover the lost data 312 so that the data 312 is available if a user makes a file request 122.

Figure 4A:
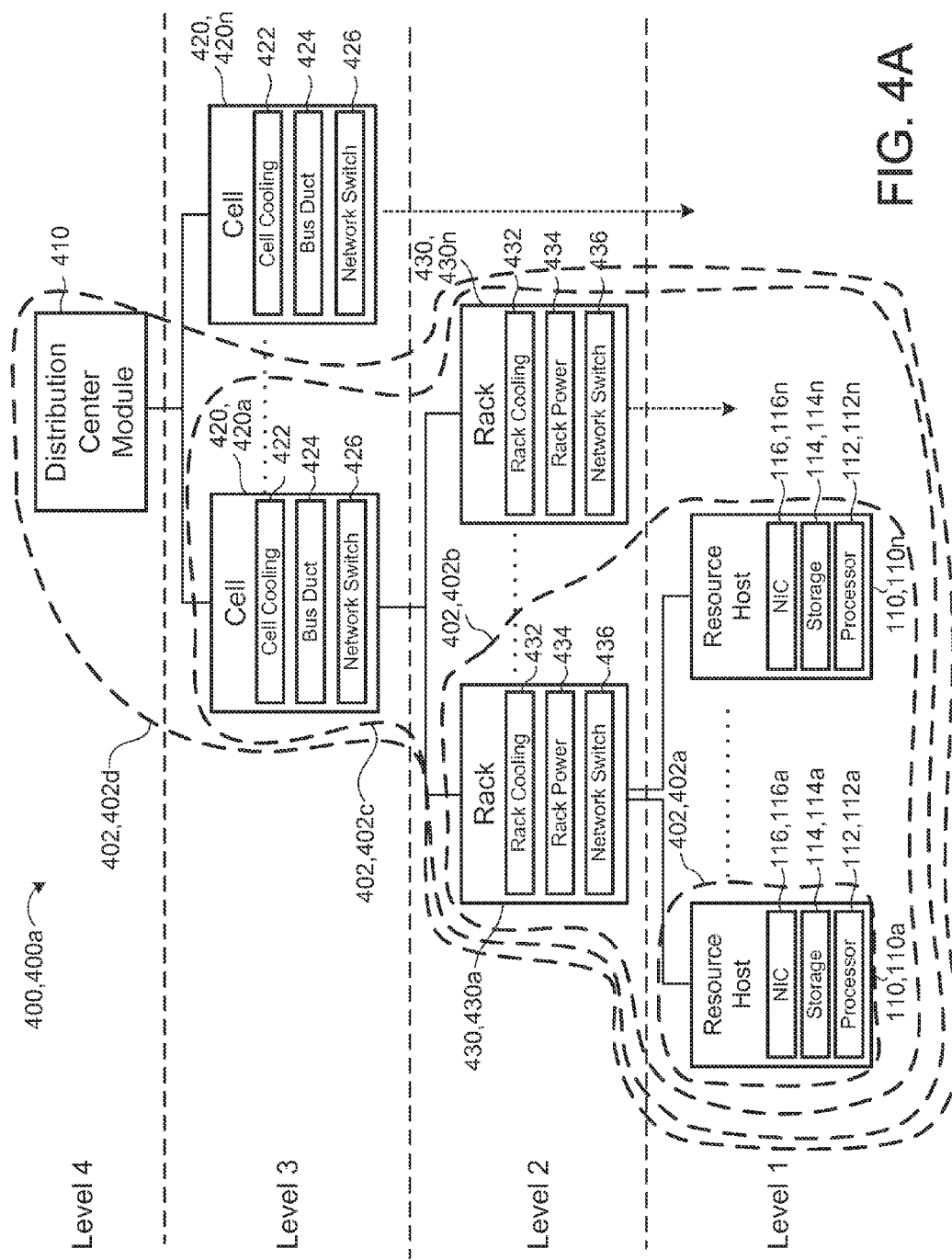
FIGS. 4A-4B are schematic views of exemplary system hierarchies.
Figure 4B:
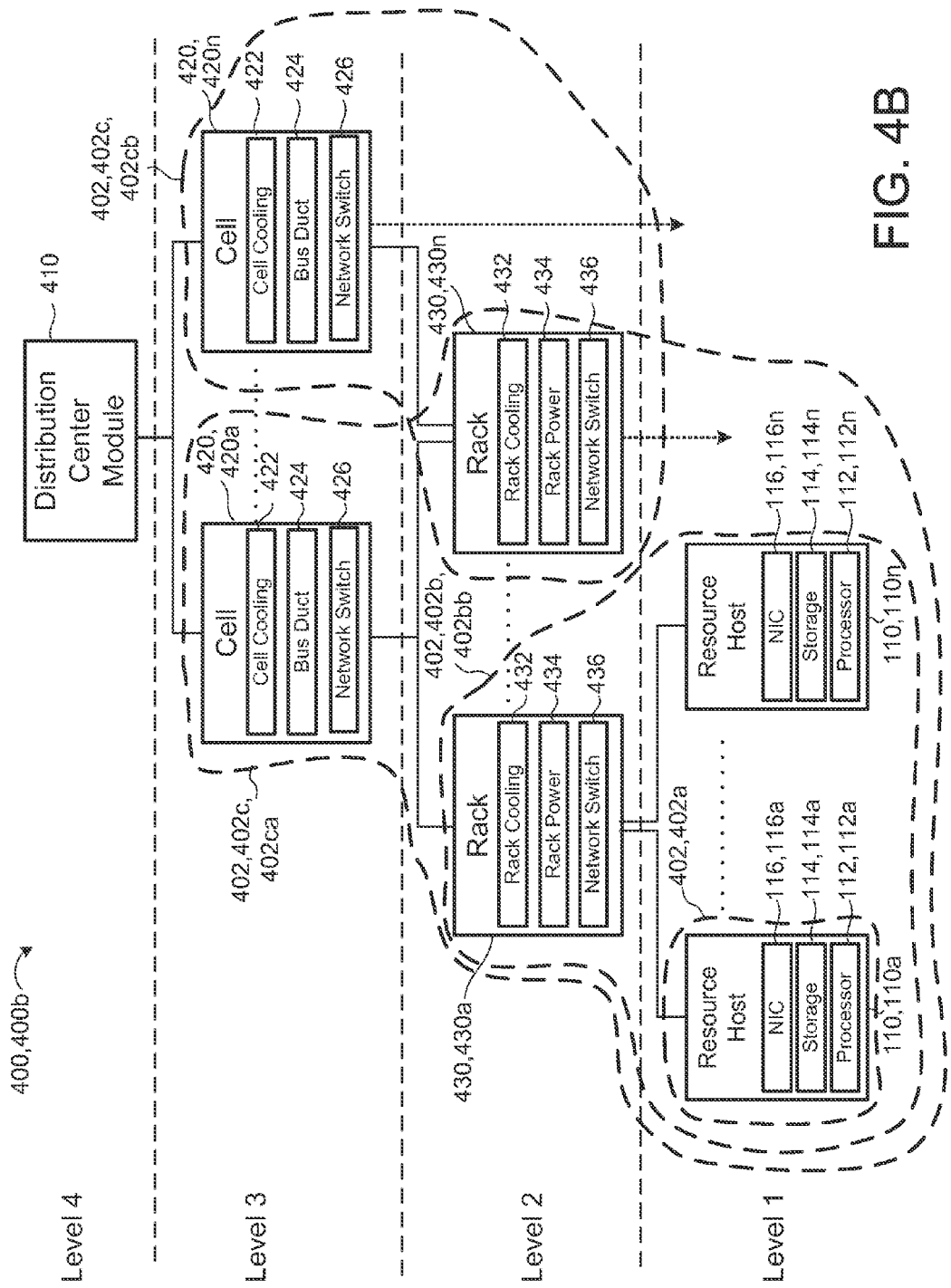

Referring to FIGS. 4A-4B, the curator 210 may determine or receive a system hierarchy 400 of the distributed storage system 100 to identify the levels (e.g., levels 1-4) at which maintenance or failure may occur without affecting a user's access to stored data 312. Maintenance or failures (strict hierarchy 400a (FIG. 4A), non-strict hierarchy 400b (FIG. 4B)) may include power maintenance/failures, cooling system maintenance/failures, networking maintenance/failures, updating or replacing parts, or other maintenance or power outage affecting the distributed storage system 100. Maintenance may be scheduled and in some examples, an unscheduled system failure may occur.

The system hierarchy 400 includes system levels (e.g., levels 1-4) with maintenance units/system domains 402 spanning one or more system levels 1-4. Each system domain 402 has an active state or an inactive state. A distribution center module 410 includes one or more cells 420, 420a-n, and each cell 420 includes one or more racks 430 of resource hosts 110. Each cell 420 also includes cell cooling 422, cell power 424 (e.g., bus ducts), and cell level networking 426 (e.g., network switch(es)). Similarly, each rack 430 includes rack cooling 432, rack power 434 (e.g., bus ducts), and rack level networking 436 (e.g., network switch(es)).

The system levels may include first, second, third, and fourth system levels 1-4. The first system, level 1 corresponds to resource hosts or host machines 110, 110a-n of data processing devices 112, non-transitory memory devices 114, or network devices 116 (e.g., NICs). Each host machine/resource host 110 has a system domain 402. The second system, level 2 corresponds to racks 430, 430a-n and cooling deliverers 432, power deliverers 434 (e.g., bus ducts), or communication deliverers 436 (e.g., network switches and cables) of the host machines 110 at the rack level. Each rack 430 or rack level-cooling deliverer 432, -power deliverer 434, or -communication deliverer 436 has a system domain 402. The third system, level 3 corresponds to any cells 420, 420a-n of the distribution center module 410 and the cell cooling 422, cell power 424, or cell level networking 426 supplied to the associated racks 430. Each cell 420 or cell cooling 422, cell power 424, or cell level networking 426 has a system domain 402. The fourth system, level 4 corresponds to the distribution center module 410. Each distribution center 410 module has a system domain 402.

FIG. 4A shows a strict system hierarchy 400a where each hierarchy component (e.g., a resource host 110, a rack 430, a cell 420, or a distribution center module 410) of the system hierarchy 400 depends on one other hierarchy component 110, 410, 420, 430. While FIG. 4B shows a non-strict system hierarchy 400b, where one hierarchy component 110, 410, 420, 430 has more than one input feed. In some examples, the curator 210 stores the system hierarchy 400 on the non-transitory memory 204 of its processor 202. For example, the curator 210 maps a first resource host 110 (and its corresponding processor resource 112a and storage resource 114a) to a first rack 430a, the first rack 430a to a first bus duct 420a, and the first bus duct 420a to a first distribution center module 410a.

The curator 210 determines, based on the mappings of the hierarchy components 110, 410, 420, 430, which resource hosts 110 are inactive when a hierarchy component 110, 410, 420, 430 is undergoing maintenance. Once the curator 210 maps the system domains 402 to the resource hosts 110 (and therefore to their corresponding processor resources 112a and storage resources 114a), the curator 210 determines a highest level (e.g., levels 1-4) at which maintenance can be performed while maintaining processor or data availability.

A system domain 402 includes a hierarchy component 110, 410, 420, 430 undergoing maintenance and any hierarchy components 110, 410, 420, 430 depending therefrom. Therefore, when one hierarchy component 110, 410, 420, 430 undergoes maintenance that hierarchy component 110, 410, 420, 430 is inactive and any other hierarchy components 110, 410 420, 430 in the system domain 402 of the hierarchy component 110, 410, 420, 430 are also inactive. For example, when a resource host 110 undergoes maintenance, a level 1 system domain 402a, which includes the storage device 114, the data processor 112, and the NIC 116, is in the inactive state. When a rack 430 undergoes maintenance, a level 2 system domain 402b, which includes the rack 430 and any resource hosts 110 depending from the rack 430, is in the inactive state. When a cell component 420 (for example, to any one of the cell cooling component 422, the bust duct 424, and/or the network switch 426 of the cell component 420a) undergoes maintenance, a level 3 system domain 402c, which includes the cell 420 and any hierarchy components 110, 410, 420, 430 in levels 3 and 4 that depend from the cell component 420, is in the inactive state. Finally, when a distribution center module 410 undergoes maintenance, a level 4 system domain 402, 402d, which includes the distribution center module 410a and any hierarchy components 110, 410, 420, 430 in levels 2 to 4 depending from the distribution center module 410, is in the inactive state.

In some examples, as shown in FIG. 4B, a non-strict hierarchy component 410, 420, 430, 114 may have dual feeds, i.e., the hierarchy component 110, 410, 420, 430 depends on two or more other hierarchy components 110, 410, 420, 430. For example, a cell component 420 may have a feed from two distribution center modules 410; and/or a rack 430 may have a dual feed from two cell components 420. As shown, a level 2 system domain 402b may include two racks 430a, 430n, where the second rack 430n includes two feeds from two cell components 420a, 420n. Therefore, the second rack 430n is part of two system domains 402ca and 402cb. Therefore, the lower levels of the system hierarchy 400 are maintained without causing the loss of the higher levels of the system hierarchy 400. This causes a redundancy in the distributed storage system 100, which allows for data accessibility. In particular, the distribution center module 410 may be maintained without losing any of the cell components 420 depending from it. In some examples, the racks 430 include a dual-powered rack that allows the maintenance of the bus duct 424 without losing power to the dual-powered racks 430 depending from it. In some examples, system domains 402 that may be maintained without causing outages are ignored when distributing chunks 330 to allow for maintenance; however, the ignored system domains 402 may be included when distributing the chunks 330 since an unplanned outage may still cause the loss of chunks 330.

In some examples, a cooling device, such as the cell cooling 422 and the rack cooling 432, are used to cool the cell components 420 and the racks 430, respectively. The cell cooling component 422 may cool one or multiple cell components 420. Similarly, a rack cooling component 432 may cool one or more racks 430. The curator 210 stores the association of the resource hosts 110 with the cooling devices (i.e., the cell cooling 422 and the rack cooling 432). In some implementations, the curator 210 considers all possible combinations of maintenance that might occur within the storage system 100 to determine a system hierarchy 400 or a combination of maintenance hierarchies 400, before storing the association of the resource hosts 110 with the cooling devices 422, 432, for example, a system hierarchy 400 where one or more cooling devices 422, 432 fail, or a system hierarchy 400 where the network devices 116, 426, 436 fail, or a system hierarchy 400 where the power distribution 424, 434 fails.

Therefore, when a hierarchy component 110, 410, 420, 430 in the storage system 100 undergoes maintenance or failures that hierarchy component 110, 410, 420, 430 and any hierarchy components 110, 410, 420, 430 that are mapped to or depending from that hierarchy component 110, 410, 420, 430 are in an inactive state. A hierarchy component 110, 410, 420, 430 in an inactive state is inaccessible by a user 120, while a hierarchy component 110, 410, 420, 430 in an active state is accessible by a user 120, allowing the user 120 to process/access data 312 stored/supported/maintained by that hierarchy component 110, 410, 420, 430. As previously mentioned, during the inactive state, a user 120 is incapable of accessing the resource host 110 associated with the system domains 402 undergoing maintenance; and therefore, the client 120 is incapable of accessing the files 310 (i.e., chunks 330, which include stripe replicas 330n, data chunks 330nD and non-data chunks 330nC).

In some implementations, the curator 210 restricts a number of chunks 330 distributed to storage devices 114 of any one system domain 402, e.g., based on the mapping of the hierarchy components 110, 410, 420, 430. Therefore, if a level 1 system domain 402 is inactive, the curator 210 maintains accessibility to the file 310 (or stripe 320) although some chunks 330 may be inaccessible. In some examples, for each file 310 (or stripe 320), the curator 210 determines a maximum number of chunks 330 that may be placed within any storage device 114 within a single system domain 402, so that if a system domain 402 associated with the storage device 114 storing chunks 330 for a file 310 is undergoing maintenance, the curator 210 may still retrieve the file 310. The maximum number of chunks 330 ensures that the curator 210 is capable of reconstructing the file 310 although some chunks 330 may be unavailable. In some examples, the maximum number of chunks 330 is set to a lower threshold to accommodate for any system failures, while still being capable of reconstructing the file 310 from the chunks 330. When the curator 210 places chunks 330 on the storage devices 114, the curator 210 ensures that within a stripe 320, no more than the maximum number of chunks 330 are inactive when a single system domain 402 undergoes maintenance. Moreover, the curator 210 may also restrict the number of processing jobs on a data processor 112 of a resource host 110 within a system domain 402, e.g., based on the mapping of the hierarchy components 110, 410, 420, 430. Therefore, if a level 1 system domain 402 is inactive, the curator 210 maintains accessibility to the jobs although some of the processors 112 of the resource hosts 110 are inactive.

Referring to FIGS. 5A-5D, scheduled and unscheduled maintenance/failure events cause a decrease in the storage system 100 capacity to store data 312 and an increase in the cost of each job 122 or storage bandwidth (since some of the jobs require data reconstruction). For example, during normal operation of the system 100, 100% of the storage devices 140 or the total storage resources S are available and can handle 100% of the operations or load L associated with the total resources S (e.g., a number of input/output operations per second allowed to hard disk storage or the amount of hard disk spindle utilization/access allowed for such storage) for storing data 312 on the storage devices 114 of the resource hosts 110 (see FIG. 5A). The system 100 may experience a failure or a maintenance event causing a portion of the total resources S to be inaccessible. Losing a portion of the resources R leads to losing a portion of the load $L_L$ that was handled by the lost resources $R_L$ (FIG. 5B). Therefore, as shown in FIG. 5B, the remaining resources $R_R$ can handle an associated load $L_R$ that is associated with the remaining resources $R_R$. Referring to FIG. 5C, the system 100 determines an adjusted load $L_A$ that the remaining resources $R_R$ handle during the maintenance or failure event. The adjusted load $L_A$ is greater than the load $L_R$ associated with the remaining resources $S_R$; therefore, the remaining resources $S_R$ handle a greater load due to a maintenance or failure event.

For example, if the system 100 experiences a failure event or a maintenance event causing 5% of the resources 110 to become unavailable, the storage capacity or remaining resources available $S_A$ is reduced to 95%, which is a decrease of 5% from the 100% of the available resources 110. In addition, 5% lost resources $S_L$ causes a loss in the load or operations handled by the 5% of the resources lost $S_L$. The system 100 increases the load $L_A$ of the remaining resources to compensate for the load $L_L$ associated with the lost resources $S_R$. During a failure or maintenance event, the cost of an operation (i.e., the number of read operations or write operations to reconstruct the data 312) increases, because the system 100 has to reconstruct data 312 that was lost due to the 5% reduced capacity. Therefore, the system 100 determines the increase in the load to reconstruct lost data 312 associated with the lost resources $S_L$, before determining the adjusted load $L_A$ associated with the remaining resources $S_R$.

As previously described, replication encoding (FIG. 3A) and erasure coding (FIGS. 3B-3H) (e.g., Reed-Solomon (FIG. 3C) and nested coding (FIGS. 3D-3H) are often used to provide data availability when a failure or maintenance occurs. In the case of replicated encoding (FIG. 3A), lost data 312 is replicated and relocated; and therefore, a direct data access is available without the need for reconstructing the data 312. However, for erasure codes, direct data 312 may become unavailable and may require expensive data reconstruction. In some examples, the different erasure coding may have a different cost of reconstruction. A cost of reconstruction is the additional operations needed to reconstruct the lost data 312. For each lost chunk 330 (requiring one read) of an erasure encoded data 312, a reconstruction scaling factor F of reads is needed to reconstruct the lost chunk 330. For example, if one chunk 330 is lost due to a lost resource, a number of chunks 330, e.g., 2 or more, are needed to reconstruct the lost chunks 330. The reconstruction cost leads to an increase in the load (adjusted load $L_A$) handled by the available or remaining resources $S_R$. The increased load $L_I$ to reconstruct the lost data 312 of the lost resources $S_L$ is calculated using the following equation:

$$L_I = L_L * F \quad (3)$$

where $L_L$ is the quantity of load lost that is associated with the lost resources $S_L$. The system 100 increases the load $L_R$ associated with the remaining resources $S_R$ and determines an adjusted load $L_A$. The adjusted load $L_A$ on the remaining resources $S_R$ during a maintenance or failure event is determined by the following equation:

$$L_A = L_R + L_I \quad (4)$$

where $L_R$ is the load handled by the remaining resources $S_R$ during a failure or maintenance event. Eq. 3 and Eq. 4 may be combined into Eq. 5, below $$L_A = L_R + (L_L * F) \quad (5A)$$

Referring to FIG. 5D, and using Reed-Solomon for encoding the data 312, the reconstruction scaling factor F may equal 8, which means for every lost chunk 330 an additional 8 reads are needed to reconstruct the lost data 312. Other reconstruction scaling factors F are possible as well. Therefore, a 5% loss of the resources results in the following:

$$L_A = 95\% + (5\% * 8) = 135\% \quad (5B)$$

Thus, a 5% loss of resources leads to a 135% usage of the resources to reconstruct the data 312 lost due to the 5% loss. Assuming that 100% of resources equals to 1000 operations per second, where an operation is a read or a write operation, a 5% loss of the storage resources 114 results in 95% available resources or 950 operations per second. Applying the above equation:

$$L_A = 950 \text{ ops/s} + (8*50 \text{ ops/sec}) = 1350 \text{ ops/s} \quad (5C)$$

Therefore, to recover a loss of 50 operations per second, 400 operations per second (8*50) are needed, which totals 1350 operations per second.

The calculations determined with respect to the Reed-Solomon encoding may also be applied to nested coding. Referring to FIG. 5E, for example, assuming that the reconstruction scaling factor F of the nested coding equals 2, and a 5% loss of resources has occurred, applying Eq. 5A results in the following:

$$L_A = 95\% + (2*5\%) = 105\% \quad (5D)$$

Thus, a loss of 5% of the resources in a nested code encoded system results in a total load increase of 105%. Considering that 100% of resources equals to 1000 operations per second, where an operation is a read or a write operation, a 5% loss of the resources results in 95% available resources or 950 operations per second. Applying the above equation:

$$L_A = 950 \text{ ops/s} + (2*50 \text{ ops/s}) = 1050 \text{ ops/s} \quad (5E)$$

Therefore, to recover a loss of 50 operations per second, 100 operations per second (2*50) are needed, which totals 1050 operations per second. Other reconstruction scaling factors F for nested encoded data are possible as well, however, generally the reconstruction scaling factors F for nested encoding is less than the reconstruction scaling factors F for nested encoding for Reed-Solomon coding.

Considering the Reed-Solomon example and the nested coding example, the increased load $L_I$ is directly related to the reconstruction scaling factor F. The larger the reconstruction scaling factor F, the larger the load increase $L_I$ and therefore the adjusted load $L_A$.

Referring to FIGS. 6A and 6B, in some implementations, the system 100 identifies two classes of jobs/requests 122. A first class of jobs 122 includes high-availability jobs 122a and a second class includes standard or low-availability jobs 122b (FIG. 1B). The system 100 executes processing jobs 122 on the processor 112 of the resource host 110 and storage jobs 122 for accessing/storing data 312 on the storage devices 114 of the resource hosts 110. The high-availability jobs 122a are jobs 122 that have a higher priority than the low-availability jobs 122b, when both types of jobs 122a, 122b are within a quota (discussed below). In some examples, when a maintenance event or a failure occurs, the system 100 accommodates for the lost load associated with the lost resources by increasing the load or spindle quotas allocated to the remaining resources.

Referring to FIG. 6B, in some implementations, during a failure or a maintenance event, the system 100 gives the high-availability jobs 122a a higher priority than the low-availability jobs 122b. In some examples, the system 100 applies a best effort to the low-availability jobs 122b to complete the low-availability jobs 122b. This causes a decrease in the data 312 accessed or requested by the low-availability jobs 122b, which allows the system 100 to use the freed-up spindles to adjust an increase in the load of the high-availability jobs 122a. Therefore, the low-availability spindle usage or load can be distributed to the high-availability jobs 122a during the maintenance or failure event. The spindle quota or portions thereof used for the low-availability jobs 122b may be redistributed to the high-availability jobs 122a.

In some implementations, the spindles are balanced across all the hierarchy components 110, 410, 420, 430, and all job requests 122 are high-availability job requests 122a using nested coding. A high-availability spindle job quota may be determined from the following values: a number P of hierarchy components 110, 410, 420, 430; a number of reads per degraded-mode read D (degraded-mode read is when a reconstruction occurs to read the data chunk 330nD); and a fraction of the spindle utilization used for the read operations $R_R$ when all the hierarchy components 110, 410, 420, 430 are available.

In some examples, the high-availability job requests 122a may include read requests $R_R$ and write requests $R_W$, as shown in the below equation:

$$R = R_R + R_W \quad (6)$$

where $R_R$ is a number, cost (e.g., resource utilization cost), or spindle usage of read requests and $R_W$ is a number, cost (e.g., resource utilization cost), or spindle usage of write requests. Since R is the total number of requests 122, then we can rewrite the previous equation in terms of fractions, to determine the value of the write request in fractions $R_{Wf}$:

$$R_{Wf} = 1 - R_{Rf} \quad (7)$$

where $R_{Wf}$ is a fraction of the spindle utilization going to write requests and $R_{Rf}$ is a fraction of the spindle utilization going to read requests, when all the resources R are available, i.e., when there are no failure or maintenance events.

In some implementations, assuming that the only requests 122 are read operations, when a maintenance event occurs, an increased load per spindle results due to a decreased spindle power or the number of available spindles, and an increased chunk reads. The chunk reads increase because more reads are needed to reconstruct the chunks 330 that were lost due to the maintenance event that caused the loss of the storage resources 114 storing these lost chunks 330. Therefore, to determine the number of reads per spindle factor $R_{RA}$ given a loss of one hierarchy component 110, 410, 420, 430, we use the following equation:

$$R_{RA} = \left(\frac{P}{P-1}\right) * \left(1 + \left(\frac{(D-1)}{P}\right)\right) \tag{8A}$$

where P is the number of hierarchy components 110, 410, 420, 430, and D is the number of reads (i.e., chunks 330) per degraded mode.

To determine the read maximum fraction $R_{RAf}$ we consider the reciprocal of the number of reads per spindle factor $R_{RA}$:

$$R_{RAf} = \frac{1}{R_{RA}} \tag{9A}$$

Considering the above equations, Eq. 8A and Eq. 9A, let's assume that the data chunks 330nD are distributed throughout 10 hierarchy component 110, 410, 420, 430, i.e., P=10, and that it takes 3 reads to reconstruct one chunk 330 lost due to the maintenance or failure event, i.e., D=3. We can calculate the number of reads per spindle factor $R_{RA}$ by applying the Eq. 8A:

$$R_{RA} = \left(\frac{10}{10-1}\right) * \left(1 + \left(\frac{(3-1)}{10}\right)\right) = 1.333 \tag{8B}$$

Determining the read maximum fraction $R_{Rf}$, we consider the reciprocal of the number of reads per spindle factor $R_{RA}$:

$$R_{RAf} = \frac{1}{1.333} = 0.750 \tag{9B}$$

Thus, for nested coding when P=10, and D=3, the number of reads per spindle factor $R_{RA}$ given a loss of one hierarchy component 110, 410, 420, 430 equals 1.333 on the available storage resources $S_R$ that are handling the adjusted load $L_A$.

Eqs. 8A and 9A are discussed with respect to nested coding, but may be applied to replicated coding and Reed-Solomon coding, as shown in Table 1 and Table 2 below. Table 1 shows exemplary calculations for Eq. 8A to determine the number of reads per spindle factor $R_{RA}$; and Table 2 shows exemplary calculations for Eq. 9A to determine the read maximum fraction $R_{RAf}$. The calculations assume that only one hierarchy component 110, 410, 420, 430 is lost. The calculations assume that all the requested jobs 122 are high-availability read jobs 122a; however, the same calculations may apply if all the jobs 122 are low-availability read jobs 122b.

TABLE 1

| | | Reads per | Number of Domains (P) | | | | | | |
| | Code | degraded mode (D) | 5.000 | 10.000 | 12.000 | 16.000 | 20.000 | 40.000 | 60.000 |
| | | | Read Spindle Ratio ($R_{RA}$) | | | | | | |
|---|---|---|---|---|---|---|---|---|---|
| Replicated Code | r = 3 | 1.000 | 1.250 | 1.111 | 1.091 | 1.067 | 1.053 | 1.026 | 1.017 |
| Nested Coding | n = 2x | 2.000 | 1.500 | 1.222 | 1.182 | 1.133 | 1.105 | 1.051 | 1.034 |
| | n = 3x | 3.000 | 1.750 | 1.333 | 1.273 | 1.200 | 1.158 | 1.077 | 1.051 |
| | n = 4x | 4.000 | 2.000 | 1.444 | 1.364 | 1.267 | 1.211 | 1.103 | 1.068 |
| Reed-Solomon | rs = 6.3 | 6.000 | 2.500 | 1.667 | 1.545 | 1.400 | 1.316 | 1.154 | 1.102 |
| | rs = 8.4 | 8.000 | 3.000 | 1.889 | 1.727 | 1.533 | 1.421 | 1.205 | 1.136 |

TABLE 2

| | | Reads per | Number of Domains (P) | | | | | | |
| | Code | degraded mode (D) | 5.000 | 10.000 | 12.000 | 16.000 | 20.000 | 40.000 | 60.000 |
| | | | Read Maximum Fraction ($R_{RAf}$) | | | | | | |
|---|---|---|---|---|---|---|---|---|---|
| Replicated Code | r = 3 | 1.000 | 0.800 | 0.900 | 0.917 | 0.938 | 0.950 | 0.975 | 0.983 |
| Nested Coding | n = 2x | 2.000 | 0.667 | 0.818 | 0.846 | 0.882 | 0.905 | 0.951 | 0.967 |
| | n = 3x | 3.000 | 0.571 | 0.750 | 0.786 | 0.833 | 0.864 | 0.929 | 0.952 |
| | n = 4x | 4.000 | 0.500 | 0.692 | 0.733 | 0.789 | 0.826 | 0.907 | 0.937 |
| Reed-Solomon | rs = 6.3 | 6.000 | 0.400 | 0.600 | 0.647 | 0.714 | 0.760 | 0.867 | 0.908 |
| | rs = 8.4 | 8.000 | 0.333 | 0.529 | 0.579 | 0.652 | 0.704 | 0.830 | 0.881 |

Assuming that the requests are high-availability read and write requests 122a, during a failure or a maintenance event, the requests 122 for the read maximum fraction $R_{Rf}$ (when all storage resources 110 are available) increases to include the impact of the lost data 312 and the reads required to reconstruct the lost data 312. Therefore, the adjusted request for reads $R_{ARf}$ may be determined using the following equation:

$$R_{ARf} = R_{Rf} * \left(1 + \left(\frac{(D-1)}{P}\right)\right) \quad (10)$$

The overall spindle demand $R_A$ may be determined using the following equation:

$$R_A = R_{Wf} + R_{ARf} = (1 - R_{Rf}) + R_{Rf} * \left(1 + \left(\frac{(D-1)}{P}\right)\right) \quad (11)$$

The overall spindle demand $R_A$ must be supported by the fraction of the remaining spindles, yielding an increase in demand per spindle of $P/(P-1)$. To determine the fraction spindle quota increase for the high availability-jobs 122a $R_{AI}$, we consider:

$$R_{AI} = \quad (12)$$
$$(R_{Wf} + R_{ARf}) * \frac{P}{P-1} = \left((1 - R_{Rf}) + R_{Rf} * \left(1 + \left(\frac{(D-1)}{P}\right)\right)\right) * \frac{P}{P-1}$$

To determine the fraction spindle quota $R_{AHAf}$ available for the high availability-jobs 122a, we consider the reciprocal of the above equation:

$$R_{AHAf} = \frac{1}{R_{AI}} = \frac{1}{\left((1 - R_{Rf}) + R_{Rf}\left(1 + \left(\frac{(D-1)}{P}\right)\right)\right) * \frac{P}{P-1}} = \quad (13A)$$

-continued
$$\frac{P-1}{\left((1 - R_{Rf}) + R_{Rf}\left(1 + \left(\frac{(D-1)}{P}\right)\right)\right) * P}$$

As an example, applying Eqs. 6 through 12, $R_{Rf}$ equals ⅔, which means that ⅔ of the job requests 122 are used for reading and the remaining ⅓ of the requests $R_{Wf}$ are used for writing. Considering a nested code having n=3×4.3×1+4+1, where there are: 3×4 data chunks 330nD, 3×1 word-check chunks 330nWC, 4 code-check chunks 330nCC, and 1 code-check-word-check chunk 330nCCWC, for the given nested code D=3 (which comes from the first digit to the right of the equals sign). Therefore, the fraction of spindle quota that can be used for high-availability requests 122a may be determined by applying Eq. 12:

$$R_{AHAf} = \frac{1}{R_A} = \quad (13B)$$
$$\frac{12 - 1}{\left(\left(1 - \frac{2}{3}\right) + \left(\frac{2}{3} * \left(1 + \left(\frac{(3-1)}{12}\right)\right)\right)\right) * 12} = 0.825 \text{ where } P = 12$$

$$R_{AHAf} = \frac{1}{R_A} = \quad (13C)$$
$$\frac{20 - 1}{\left(\left(1 - \frac{2}{3}\right) + \left(\frac{2}{3} * \left(1 + \left(\frac{(3-1)}{20}\right)\right)\right)\right) * 20} = 0.891 \text{ where } P = 20$$

Eqs. 12 and 13A are discussed with respect to nested coding, but may be applied to replicated coding and Reed-Solomon coding, as shown in Table 3 and Table 4 below. Table 3 shows exemplary calculations for Eq. 12 to determine the number of reads $R_A$ per spindle factor, and Table 4 shows exemplary calculations for Eq. 13 to determine the read maximum fraction $R_{AHAf}$. The calculations assume that only one hierarchy component 110, 410, 420, 430 is lost. The calculations also assume that all the requested jobs 122 are high-availability jobs 122a (read and write jobs); however, the same calculations may apply if all the jobs 122 are low-availability jobs 122b.

TABLE 3

| | | Reads per | Number of Domains (P) | | | | | | |
|---|---|---|---|---|---|---|---|---|---|
| | Code | degraded mode (D) | 5.000 | 10.000 | 12.000 | 16.000 | 20.000 | 40.000 | 60.000 |
| | | | Total Spindle Ratio ($R_A$) | | | | | | |
| Replicated Code | r = 3 | 1.000 | 1.250 | 1.111 | 1.091 | 1.067 | 1.053 | 1.026 | 1.017 |
| Nested Coding | n = 2x | 2.000 | 1.417 | 1.185 | 1.152 | 1.111 | 1.088 | 1.043 | 1.028 |
| | n = 3x | 3.000 | 1.583 | 1.259 | 1.212 | 1.156 | 1.123 | 1.060 | 1.040 |
| | n = 4x | 4.000 | 1.750 | 1.333 | 1.273 | 1.200 | 1.158 | 1.077 | 1.051 |
| Reed-Solomon | rs = 6.3 | 6.000 | 2.083 | 1.481 | 1.394 | 1.289 | 1.228 | 1.111 | 1.073 |
| | rs = 8.4 | 8.000 | 2.417 | 1.630 | 1.515 | 1.378 | 1.298 | 1.145 | 1.096 |

Calculating $R_A$ (assuming Reads = 2/3)

TABLE 4 calculating $R_{AHAf} = 1/R_A$ (assuming Reads = 2/3)

| | | Reads per degraded mode (D) | Number of Domains (P) | | | | | | |
|---|---|---|---|---|---|---|---|---|---|
| | Code | | 5.000 | 10.000 | 12.000 | 16.000 | 20.000 | 40.000 | 60.000 |
| | | | | | Total Maximum Fraction ($R_{AHAf}$) | | | | |
| Replicated Code | r = 3 | 1.000 | 0.800 | 0.900 | 0.917 | 0.938 | 0.950 | 0.975 | 0.983 |
| Nested Coding | n = 2x | 2.000 | 0.706 | 0.844 | 0.868 | 0.900 | 0.919 | 0.959 | 0.973 |
| | n = 3x | 3.000 | 0.632 | 0.794 | 0.825 | 0.865 | 0.891 | 0.944 | 0.962 |
| | n = 4x | 4.000 | 0.571 | 0.750 | 0.786 | 0.833 | 0.864 | 0.929 | 0.952 |
| Reed-Solomon | rs = 6.3 | 6.000 | 0.480 | 0.675 | 0.717 | 0.776 | 0.814 | 0.900 | 0.932 |
| | rs = 8.4 | 8.000 | 0.414 | 0.614 | 0.660 | 0.726 | 0.770 | 0.873 | 0.912 |

The above formulas are used to calculate the high-availability spindle fraction $R_{AHAf}$ considering that all the jobs 122 are high availability jobs 122a using nested coding. Another consideration taken is that all the data 312 (i.e., chunks 330) are evenly distributed within the hierarchy component 110, 410, 420, 430. However, the data 312 may not be evenly distributed throughout the hierarchy component 110, 410, 420, 430, which may lead to a decrease in the high availability spindle fraction $R_{AHAf}$ that is available. Moreover, in some examples, not all the data 312 is encoded with nested codes. For example, if some data 312 is replicated data 312, it does not increase the demand for reads when a hierarchy component 110, 410, 420, 430 is lost. Therefore, having data 312 that is replicated would tend to increase the high-availability spindle fraction $R_{AHAf}$.

In some implementations, the bytes and the spindles are evenly balanced across the hierarchy components 110, 410, 420, 430. When determining the spindle quota, the important factor is the distribution of the spindles (rather than the bytes) across the hierarchy components 110, 410, 420, 430. Therefore, when the spindles are not evenly distributed across the hierarchy components 110, 410, 420, 430, consider the parameter P above to be the largest integer such that at most 1/P of the spindles are located on any one of the hierarchy components 110, 410, 420, 430. In this instance, the above formula can be used to calculate the fraction of spindle quota that can be used for the high availability requests 122a.

In general, when a hierarchy component 110, 410, 420, 430 is lost due to maintenance or failure, the low-availability requests 122b are evicted and they receive no spindle quota or a best effort is applied. However, in some examples, additional temporary resources may be available during maintenance on all, or many, of the hierarchy components 110, 410, 420, 430. In such an instance, both high-availability jobs 122a and low-availability jobs 122b continue their operation with one lost hierarchy component 110, 410, 420, 430. The following equations determine the quantity of temporary spindles that are required to maintain the operation of the high-availability and the low-availability jobs 122a, 122b. Previously, only high-availability jobs 122a were considered, but in this case both high-availability jobs 122a and low-availability jobs 122b are considered. To determine the quantity of temporary spindles that are required, the following values are used: the number P of hierarchy components 110, 410, 420, 430; a number $D_H$ of reads per degraded-mode read for high-availability jobs 122a, a number of reads $D_L$ per degraded-mode read for low-availability jobs 122b, and a fraction of the spindle utilization used for the read operations $R_{Rf}$ when all the hierarchy components 110, 410, 420, 430 are available.

In some examples, when one hierarchy component 110, 410, 420, 430 is lost, the high-availability jobs 122a create a load per spindle on the remaining spindles that equals the total load per spindle when no hierarchy components 110, 410, 420, 430 are lost. In addition to this load per spindle (denoted as "1"), the low-availability requests 122b create additional load as quantified below. First, let $$F_{HA(before)} = \frac{P-1}{P*\left[(1-R_{Rf})+\left(R_{Rf}*\left(1+\frac{(D_H-1)}{P}\right)\right)\right]} \quad (14A)$$

where $F_{HA(before)}$ is the fraction of high-availability spindle usage prior to hierarchy components 110, 410, 420, 430 being lost, and the fraction of low-availability spindle usage $F_{LA(before)}$ prior to a hierarchy components 110, 410, 420, 430 is determined by the following equation:

$$F_{LA(before)} = 1 - F_{HA(before)} \quad (15)$$

This low-availability spindle usage $F_{LA(before)}$ increases by a factor $M_{LA(I)}$ of:

$$M_{LA(I)} = \left[(1-R_{Rf})+\left(R_{Rf}*\frac{(D_L-1)}{P}\right)\right]*\frac{P}{P-1} \quad (16A)$$

The above equation Eq. 17, may be used to determine the high-availability spindle usage $F_{HA(before)}$ increased by a factor $M_{HA(I)}$ of:

$$M_{HA(I)} = \left[(1-R_{Rf})+\left(R_{Rf}*\frac{(D_H-1)}{P}\right)\right]*\frac{P}{P-1} \quad (17)$$

Therefore, a total increase $M_{(I)}$ in the spindle usage may be determined by:

$$M_{(I)} = M_{LA(I)} + M_{HA(I)} \quad (18)$$

Moreover, after a hierarchy components 110, 410, 420, 430 is lost, a total of low-availability usage per spindle $F_{LA\ (after)}$ is determined by the following equation:

$$F_{LA(after)} = (1-F_{HA(before)})*\left[(1-R_{Rf})+\left(R_{Rf}*\frac{(D_L-1)}{P}\right)\right]*\frac{P}{P-1} \quad (19A)$$

where $F_{LA(after)}$ is the low-availability spindle usage per spindle after a hierarchy component 110, 410, 420, 430 is lost.

A total of high-availability usage per spindle $F_{HA\ (after)}$ may be determined by the following equation:

$$F_{HA(after)} = (1 - F_{LA(before)}) * \left[(1 - R_{Rf}) + \left(R_{Rf} * \frac{(D_H - 1)}{P}\right)\right] * \frac{P}{P-1} \quad (20)$$

Adding the low-availability spindle usage per spindle $F_{LA\ (after)}$ to the per-spindle high-availability usage, results in the following equation:

$$F_{T(after)} = \quad (21)$$
$$1 + (1 - F_{HA(before)}) * \left[(1 - R_{Rf}) + \left(R_{Rf} * \frac{(D_L - 1)}{P}\right)\right] * \frac{P}{P-1}$$

or $$F_{T(after)} = \quad (22)$$
$$1 + (1 - F_{LA(before)}) * \left[(1 - R_{Rf}) + \left(R_{Rf} * \frac{(D_H - 1)}{P}\right)\right] * \frac{P}{P-1}$$

where $F_{T\ (after)}$ is the total spindle usage after a hierarchy component 110, 410, 420, 430 is lost. Therefore, for every spindle that is normally present in a hierarchy component 110, 410, 420, 430, an additional temporary spindle $M_{(I)}$ (as determined by Eq. 18) should be added in order to allow both the high-availability jobs 122a and the low-availability jobs 122b to operate during the maintenance.

In some examples, applying Eqs. 14A, 16A and 19A, consider $R_{Rf}$ equals ⅔, which means that ⅔ of the requests 122 are used for reading and the remaining ⅓ of the requests 122 $R_{Wf}$ are used for writing. For $D_H$=3, assuming that $D_L$ equals 8 (which models the case of all non-SC data being encoded with rs=8.4) and P=40 (which corresponds to a 20 MW cell with 500 kW bus ducts). In the examples, we assume that only the low-availability jobs 122b increase the spindle requirement.

$$F_{HA(before)} = \frac{40 - 1}{40 * \left[\left(1 - \frac{2}{3}\right) + \left(\frac{2}{3} * \left(1 + \frac{(3-1)}{40}\right)\right)\right]} = 0.944 \quad (14B)$$

and $$M_{LA(I)} = \left[\left(1 - \frac{2}{3}\right) + \left(\frac{2}{3} * \frac{(8-1)}{40}\right)\right] * \frac{40}{40-1} = 1.145 \quad (16B)$$

For every spindle that is normally present in the cell, an additional 0.065 temporary spindles should be added in order to allow both high-availability and low-availability job requests 122a, 122b to operate during maintenance, as determines as follows:

$$F_{LA(after)} = (1 - 0.944) * 1.145 = 0.065 \quad (19B)$$

Considering another example, applying the above Eqs. 14A, 16A and 19A, consider $R_{Rf}$ equals ⅔, which means that ⅔ of the requests 122 are used for reading and the remaining ⅓ of the requests 122 $R_{Wf}$ are used for writing. For $D_H$=3, assuming that $D_L$ equals 8 (which models the case of all non-SC data being encoded with rs:=8.4) and P=60 (which corresponds to a 20 MW cell with 500 kW bus ducts).

$$F_{HA(before)} = \frac{60 - 1}{60 * \left[\left(1 - \frac{2}{3}\right) + \left(\frac{2}{3} * \left(1 + \frac{(3-1)}{60}\right)\right)\right]} = 0.962 \quad (14C)$$

and $$M_{LA(I)} = \left[\left(1 - \frac{2}{3}\right) + \left(\frac{2}{3} * \frac{(8-1)}{60}\right)\right] * \frac{60}{60-1} = 1.096 \quad (16C)$$

For every spindle that is normally present in the cell, an additional 0.042 temporary spindles should be added in order to allow both high-availability and low-availability job requests 122a, 122b to operate during maintenance, as determined as follow:

$$F_{LA(after)} = (1 - 0.962) * 1.096 = 0.042 \quad (19C)$$

Figure 7:
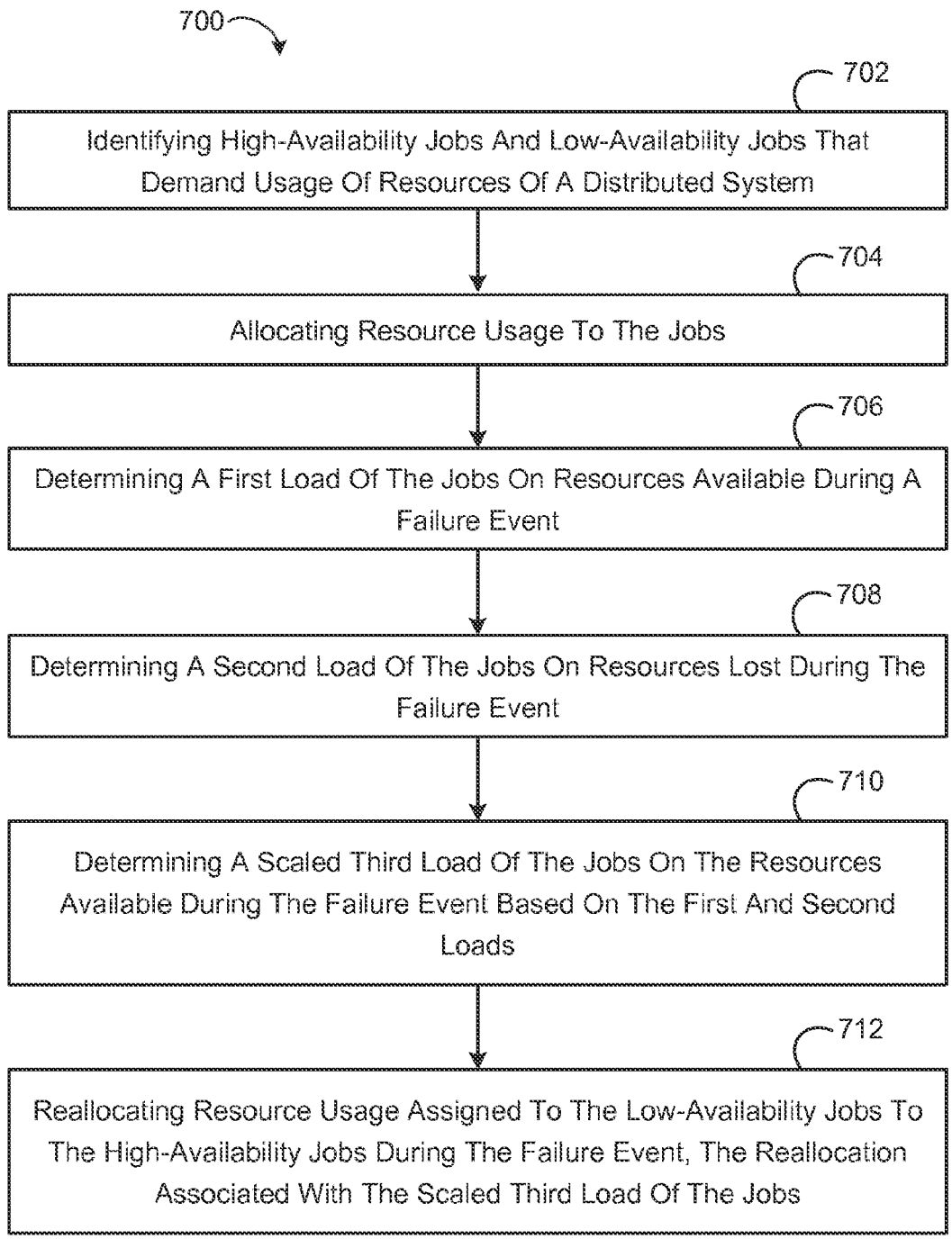
FIG. 7 is a schematic view of an exemplary arrangement of operations for efficiently using resources of a system during maintenance or failure events.

Referring to FIG. 7, in some implementations, a method 700 for efficiently using resources 110 (e.g., memory devices) in data centers of a distributed storage system 100 includes identifying 702 high-availability jobs 122a and low-availability jobs 122b that demand usage of resources 110 of the distributed system 100. The method 700 further includes allocating 704 resource usage to the jobs 122, determining 706 a first load of the jobs 122 on resources 110 available during a failure event, and determining 708 a second load of the jobs 122 on the resources 110 lost during the failure event. The method 700 includes determining 710 a scaled third load of the jobs 122 on the resources 110 available during the failure event based on the first and second loads and reallocating 7012 resource usage assigned to the low-availability jobs 122b to the high-availability jobs 122a during the failure event. The reallocation is associated with the scaled third load of the jobs 122.

In some implementations, the high-availability jobs 122a have a higher execution priority than the low-availability jobs 122b. The resources 110 may include non-transitory memory devices. The method 700 includes determining the scaled third load of the jobs 122 using Eq. 5A. When the resources 110 include data storage resources having spindles and the jobs 122 all include high-availability read jobs 122a or low-availability read jobs 122b, the method 700 includes determining a number of read requests per spindle $R_{RA}$ using Eq. 8A. The method 700 includes reallocating the resource usage based on the read requests per spindle $R_{RA}$. Additionally or alternatively, the method 700 includes determining a read maximum fraction $R_{RF}$ using Eq. 9A. The method 700 includes reallocating the resource usage based on the read maximum fraction $R_{RF}$.

In some implementations, when the resources 110 include data storage resources having spindles and the jobs 122 all include high-availability jobs 122a or low-availability jobs 122b, the method 700 includes determining an adjusted request for read operations $R_{ARf}$ during the failure event using Eq. 10. The method includes reallocating the resource usage based on the adjusted request for read operations. Additionally or alternatively, the method 700 includes determining an overall spindle demand $R_A$ during the failure event using Eq. 11. The method 700 includes reallocating the resource usage based on the overall spindle demand $R_A$ during the failure event. The method 700 may further include determining a fraction spindle quota increase $R_{AI}$ per spindle using Eq. 12.

The method 700 includes reallocating the resource usage based on the fraction spindle quota increase. Additionally or alternatively, the method 700 includes determining a fraction spindle quota $R_{AHAf}$ available for the high-availability jobs 122a using Eq. 13. The method 700 includes reallocating the resource usage based on the fraction spindle quota $R_{AHAf}$.

In some examples, the method 700 includes determining a low-availability scaled third load of the jobs 122 on temporary resources 110 available during the failure event based on the first and second loads of low-availability jobs 122b. When the resources 110 include data storage resources 110 having spindles, the method 700 may include determining a fraction of high-availability spindle usage $F_{HA(before)}$ prior to the failure event using Eq. 14A. The method 700 includes reallocating the resource usage based on the fraction of high-availability spindle usage $F_{HA(before)}$. Additionally or alternatively, the method 700 includes determining an increase factor of low-availability job usage $M_{LA(I)}$ using Eq. 16A. The method 700 includes reallocating the resource usage based on the increase factor of low-availability job usage $M_{LA(I)}$.

In some implementations, the method 700 includes determining a total of low-availability usage per spindle $F_{LA(after)}$ after a resource 110 is lost using Eq. 19A. The method includes reallocating the resource usage based on the total of low-availability usage per spindle $F_{LA(after)}$. Additionally or alternatively, the method 700 includes determining a total spindle usage $F_{T(after)}$ using Eq. 21. The method includes reallocating the resource usage based on the total spindle usage.

Figure 8:
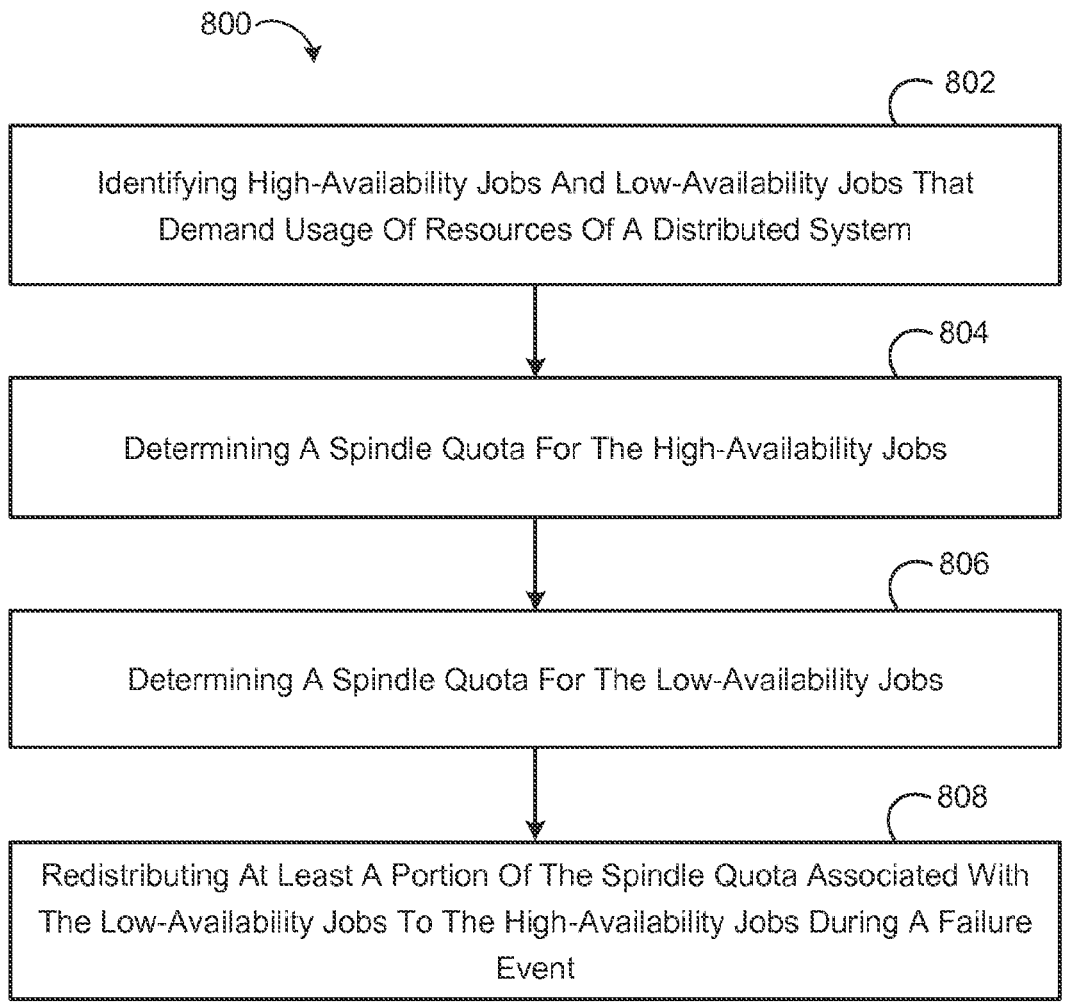
FIG. 8 is a schematic view of an exemplary arrangement of operations for efficiently using resources of a system during maintenance or failure events.

Referring to FIG. 8, in some implementations, a method 800 includes identifying 802 high-availability jobs 122a and low-availability jobs 122b that demand usage of data storage resources 110 of a distributed storage system 100. The data storage resource has spindles. The method 800 further includes determining 804 a spindle quota for the high-availability jobs 122a and determining 806 a spindle quota for the low-availability jobs 122b. The method 800 further includes redistributing 808 at least a portion of the spindle quota associated with the low-availability jobs 122b to the high-availability jobs 122a during a failure event.

In some examples, when the jobs 122 all include high-availability read jobs 122a or low-availability read jobs 122b, the method 800 includes determining a number of read requests per spindle $R_{RA}$ when a loss of at least one data storage resource occurs using Eq. 8A. The method 800 also includes determining a read maximum fraction $R_{RF}$ using Eq. 9A. The method 800 includes reallocating the resource usage based on the read requests per spindle $R_{RA}$ or the read maximum fraction $R_{RF}$.

In some implementations, when the jobs 122 all include high-availability jobs 122a or low-availability jobs 122b, the method 800 includes determining a fraction spindle quota increase $R_{AI}$ per spindle using Eq. 12 and a fraction spindle quota $R_{AHAf}$ available for the high-availability jobs 122a using Eq. 13. The method includes reallocating the resource usage based on the fraction spindle quota increase $R_{AI}$ or the fraction spindle quota $R_{RF}$. The method 800 further includes determining a low-availability scaled third load of the jobs 122 on temporary resources 110 available during the failure event based on the first and second loads of availability jobs 122.

In some examples, when the resources 110 include data storage resources having spindles, the method 800 includes determining a fraction of high-availability spindle usage $F_{HA(before)}$ prior to the failure event using Eq. 14A. The method includes reallocating the resource usage based on the fraction of high-availability spindle usage $F_{HA(before)}$. Additionally or alternatively, the method 800 includes determining an increase factor of low-availability job usage $M_{LA(I)}$ using Eq. 16A and determining a total of low-availability usage per spindle $F_{LA(after)}$ after a resource is lost using Eq. 19A. The method includes reallocating the resource usage based on the total of low-availability usage per spindle $F_{LA(after)}$. The method 800 may further include determining a total spindle usage $F_{T(after)}$ using Eq. 21. The method includes reallocating the resource usage based on the total spindle usage $F_{T(after)}$.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as an application, program, gram, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A method comprising:
  identifying, using a data processing device, high-availability jobs and low-availability jobs that demand usage of resources of a distributed system;
  allocating resource usage to the jobs using the data processing device;

determining, using the data processing device, a first load of the jobs on resources available during a failure event;

determining, using the data processing device, a second load of the jobs on resources lost during the failure event;

determining, using the data processing device, a scaled third load of the jobs on the resources available during the failure event based on the first and second loads; and reallocating, using the data processing device, resource usage assigned to the low-availability jobs to the high-availability jobs during the failure event, the reallocation associated with the scaled third load of the jobs.

2. The method of claim 1, wherein the high-availability jobs have a higher execution priority than the low-availability jobs.

3. The method of claim 1, wherein the resources comprise non-transitory memory devices.

4. The method of claim 1, wherein determining the scaled third load of the jobs comprises determining:

$$L_A = L_R + (L_L * F)$$

wherein $L_R$ is the first load, $L_L$ is the second load, $L_A$ is the third load, and F is a scaling factor corresponding to an increased load on the resources available during the failure event to handle any jobs associated with the resources lost during the failure event.

5. The method of claim 4, wherein, for data storage resources, the scaling factor F is based on a type of encoding of data.

6. The method of claim 1, further comprising when the resources comprise data storage resources having spindles and the jobs all comprise high-availability read jobs or low-availability read jobs:

determining a number of read requests per spindle $R_{RA}$ when a loss of at least one data storage resource occurs as:

$$R_{RA} = \left(\frac{P}{P-1}\right) * \left(1 + \left(\frac{(D-1)}{P}\right)\right)$$

where P is a number of resources comprising available data storage resources and non-available data storage resources, and D is a number of read operations to reconstruct data lost due to the failure event; and reallocating the resource usage based on the read requests per spindle.

7. The method of claim 6, further comprising:

determining a read maximum fraction $R_{Rf}$ as:

$$R_{RAf} = \frac{1}{R_{RA}}$$

where the read maximum fraction $R_{Rf}$ represents a number of maximum read operations capable of being handled by the available resources during the failure event; and reallocating the resource usage based on the read maximum fraction.

8. The method of claim 1, further comprising, when the resources comprise data storage resources having spindles and the jobs all comprise high-availability jobs or low-availability jobs:

determining an adjusted request for read operations $R_{ARf}$ during the failure event as:

$$R_{ARf} = R_{Rf} * \left(1 + \left(\frac{(D-1)}{P}\right)\right)$$

where $R_{Rf}$ is a fraction of read operations before the failure event, P is a total number of resources including available resources and non-available resources, and D is a number of read operations to reconstruct data lost due to the failure event; and reallocating the resource usage based on the adjusted request for read operations.

9. The method of claim 8, further comprising:

determining an overall spindle demand $R_A$ during the failure event as:

$$R_A = (1 - R_{Rf}) + R_{Rf} * \left(1 + \left(\frac{(D-1)}{P}\right)\right)$$

reallocating the resource usage based on the overall spindle demand during the failure event.

10. The method of claim 9, further comprising:

determining a fraction spindle quota increase $R_{AI}$ per spindle as:

$$R_{AI} = \left((1 - R_{Rf}) + R_{Rf} * \left(1 + \left(\frac{(D-1)}{P}\right)\right)\right) * \frac{P}{P-1}; \text{ and}$$

reallocating the resource usage based on the fraction spindle quota increase.

11. The method of claim 10, further comprising:

determining a fraction spindle quota $R_{AHAf}$ available for the high-availability jobs as:

$$R_{AHAf} = \frac{1}{R_{AI}} = \frac{P-1}{\left((1 - R_{Rf}) + R_{Rf}\left(1 + \left(\frac{(D-1)}{P}\right)\right)\right) * P};$$

reallocating the resource usage based on the fraction spindle quota.

12. The method of claim 1, further comprising determining a low-availability scaled third load of the jobs on temporary resources available during the failure event based on the first and second loads of low-availability jobs.

13. The method of claim 1, further comprising, when the resources comprise data storage resources having spindles:

determining a fraction of high-availability spindle usage $F_{HA(before)}$ prior to the failure event as:

$$F_{HA(before)} = \frac{P-1}{P * \left[(1 - R_{Rf}) + \left(R_{Rf} * \left(1 + \frac{(D_H - 1)}{P}\right)\right)\right]}$$

where $R_{Rf}$ a fraction of spindle utilization used for read operations prior to the failure event, P is a total number of resources including available resources and non-available resources, and $D_H$ is a number of read operations to reconstruct data lost due to the failure event; and reallocating the resource usage based on the fraction of high-availability spindle usage.

14. The method of claim 13, further comprising:
determining an increase factor of low-availability job usage $M_{LA(I)}$ as:

$$M_{LA(I)} = \left[(1 - R_{Rf}) + \left(R_{Rf} * \frac{(D_L - 1)}{P}\right)\right] * \frac{P}{P - 1}$$

where $D_L$ is a number of read operations to reconstruct data lost due to the failure event for low-availability jobs; and
reallocating the resource usage based on the increase factor of low-availability job usage.

15. The method of claim 14, further comprising:
determining a total of low-availability usage per spindle $F_{LA\ (after)}$ after a resource is lost as:

$$F_{LA(after)} = (1 - F_{HA(before)}) * \left[(1 - R_{Rf}) + \left(R_{Rf} * \frac{(D_L - 1)}{P}\right)\right] * \frac{P}{P - 1}; \text{ and}$$

reallocating the resource usage based on the total of low-availability usage per spindle.

16. The method of claim 15, further comprising:
determining a total spindle usage $F_{T\ (after)}$ as:

$$F_{T(after)} = 1 + (1 - F_{HA(before)}) * \left[(1 - R_{Rf}) + \left(R_{Rf} * \frac{(D_L - 1)}{P}\right)\right] * \frac{P}{P - 1}; \text{ and}$$

reallocating the resource usage based on the total spindle usage.

17. A method comprising:
identifying, using a data processing device, high-availability jobs and low-availability jobs that demand usage of data storage resources of a distributed storage system, the data storage resources having spindles;
determining, using the data processing device, a spindle quota for the high-availability jobs;
determining, using the data processing device, a spindle quota for the low-availability jobs; and
redistributing, using the data processing device, at least a portion of the spindle quota associated with the low-availability jobs to the high-availability jobs during a failure event.

18. The method of claim 17, further comprising when the jobs all comprise high-availability read jobs or low-availability read jobs:
determining a number of read requests per spindle $R_{RA}$ when a loss of at least one data storage resource occurs as:

$$R_{RA} = \left(\frac{P}{P - 1}\right) * \left(1 + \left(\frac{(D - 1)}{P}\right)\right)$$

where P is a number of resources comprising available data storage resources and non-available data storage resources, and D is a number of read operations to reconstruct data lost due to the failure event;

determining a read maximum fraction $R_{Rf}$ as:

$$R_{RAf} = \frac{1}{R_{RA}}$$

where the read maximum fraction $R_{Rf}$ represents a number of maximum read operations capable of being handled by the available resources during the failure event; and
reallocating the resource usage based on the read requests per spindle or the read maximum fraction.

19. The method of claim 17, further comprising, when the jobs all comprise high-availability jobs or low-availability jobs:
determining a fraction spindle quota increase $R_{AI}$ per spindle as:

$$R_{AI} = \left((1 - R_{Rf}) + R_{Rf} * \left(1 + \left(\frac{(D - 1)}{P}\right)\right)\right) * \frac{P}{P - 1}$$

where $R_{Rf}$ is a fraction of read operations before the failure event, P is a total number of resources including available resources and non-available resources, and D is a number of read operations to reconstruct data lost due to the failure event;
determining a fraction spindle quota $R_{AHAf}$ available for the high-availability jobs as:

$$R_{AHAf} = \frac{1}{R_{AI}}; \text{ and}$$

reallocating the resource usage based on the fraction spindle quota increase or the fraction spindle quota.

20. The method of claim 17, further comprising determining a low-availability scaled third load of the jobs on temporary resources available during the failure event based on the first and second loads of low-availability jobs.

21. The method of claim 17, further comprising, when the resources comprise data storage resources having spindles:
determining a fraction of high-availability spindle usage $F_{HA(before)}$ prior to the failure event as:

$$F_{HA(before)} = \frac{P - 1}{P * \left[(1 - R_{Rf}) + \left(R_{Rf} * \left(1 + \frac{(D_H - 1)}{P}\right)\right)\right]}$$

where $R_{Rf}$ a fraction of spindle utilization used for read operations prior to the failure event, P is a total number of resources including available resources and non-available resources, and $D_H$ is a number of read operations to reconstruct data lost due to the failure event; and
reallocating the resource usage based on the fraction of high-availability spindle usage.

22. The method of claim 21, further comprising:
determining an increase factor of low-availability job usage $M_{LA(I)}$ as:

$$M_{LA(I)} = \left[(1 - R_{Rf}) + \left(R_{Rf} * \frac{(D_L - 1)}{P}\right)\right] * \frac{P}{P - 1}$$

where $D_L$ is a number of read operations to reconstruct data lost due to the failure event for low-availability jobs;
determining a total of low-availability usage per spindle $F_{LA\,(after)}$ after a resource is lost as:

$$F_{LA(after)} = (1 - F_{HA(before)}) * M_{LA(I)};\text{ and}$$

reallocating the resource usage based on the total of low-availability usage per spindle.

23. The method of claim 22, further comprising:
determining a total spindle usage $F_{T\,(after)}$ as:

$$F_{T(after)} = 1 + (1 - F_{HA(before)}) * \left[(1 - R_{Rf}) + \left(R_{Rf} * \frac{(D_L - 1)}{P}\right)\right] * \frac{P}{P-1};\text{ and}$$

reallocating the resource usage based on the total spindle usage.

24. A system comprising:
resources of a distributed system; and
a computer processor in communication with the resources, the computer processor:
identifying high-availability jobs and low-availability jobs that demand usage of resources of a distributed system, the high-availability jobs have a higher execution priority than the low-availability jobs;
allocating resource usage to the jobs;
determining a first load of the jobs on resources available during a failure event;
determining a second load of the jobs on resources lost during the failure event;
determining a scaled third load of the jobs on the resources available during the failure event based on the first and second loads; and
reallocating resource usage assigned to the low-availability jobs to the high-availability jobs during the failure event, the reallocation associated with the scaled third load of the jobs.

25. The system of claim 24, wherein the resources comprises non-transitory memory devices.

26. The system of claim 24, wherein the computer processor determines the scaled third load of the jobs as:

$$L_A = L_R + (L_L * F)$$

wherein $L_R$ is the first load, $L_L$ is the second load, $L_A$ is the third load, and F is a scaling factor corresponding to an increased load on the resources available during the failure event to handle any jobs associated with the resources lost during the failure event, the scaling factor F based on a type of encoding of data.

27. The system of claim 24, wherein, when the jobs all comprise high-availability read jobs or low-availability read jobs, the computer processor:
determines a number of read requests per spindle $R_{RA}$ when a loss of at least one data storage resource occurs as:

$$R_{RA} = \left(\frac{P}{P-1}\right) * \left(1 + \left(\frac{(D-1)}{P}\right)\right)$$

where P is a number of resources comprising available data storage resources and non-available data storage resources, and D is a number of read operations to reconstruct data lost due to the failure event;

determines a read maximum fraction $R_{Rf}$ as:

$$R_{RAf} = \frac{1}{R_{RA}}$$

where the read maximum fraction $R_{Rf}$ represents a number of maximum read operations capable of being handled by the available resources during the failure event; and
reallocates the resource usage based on the read requests per spindle or the read maximum fraction.

28. The system of claim 24, wherein, when the jobs all comprise high-availability jobs or low-availability jobs, the computer processor:
determines a fraction spindle quota increase $R_{AI}$ per spindle as:

$$R_{AI} = \left((1 - R_{Rf}) + R_{Rf} * \left(1 + \left(\frac{(D-1)}{P}\right)\right)\right) * \frac{P}{P-1}$$

where $R_{Rf}$ is a fraction of read operations before the failure event, P is a total number of resources including available resources and non-available resources, and D is a number of read operations to reconstruct data lost due to the failure event;
determines a fraction spindle quota $R_{AHAf}$ available for the high-availability jobs as:

$$R_{AHAf} = \frac{1}{R_{AI}};$$

reallocates the resource usage based on the fraction spindle quota increase or the fraction spindle quota.

29. The system of claim 24, wherein the computer processor determines a low-availability scaled third load of the jobs on temporary resources available during the failure event based on the first and second loads of low-availability jobs.

30. The system of claim 24, wherein the computer processor:
determines a fraction of high-availability spindle usage $F_{HA(before)}$ prior to the failure event as:

$$F_{HA(before)} = \frac{P-1}{P * \left[(1 - R_{Rf}) + \left(R_{Rf} * \left(1 + \frac{(D_H - 1)}{P}\right)\right)\right]}$$

where $R_{Rf}$ a fraction of spindle utilization used for read operations prior to the failure event, P is a total number of resources including available resources and non-available resources, and $D_H$ is a number of read operations to reconstruct data lost due to the failure event; and
reallocates the resource usage based on the fraction of high-availability spindle usage.

31. The system of claim 30, wherein the computer processor:
determines an increase factor of low-availability job usage $M_{LA(I)}$ as:

$$M_{LA(I)} = \left[(1 - R_{Rf}) + \left(R_{Rf} * \frac{(D_L - 1)}{P}\right)\right] * \frac{P}{P-1}$$

where $D_L$ is a number of read operations to reconstruct data lost due to the failure event for low-availability jobs;

determines a total of low-availability usage per spindle $F_{LA\ (after)}$ after a resource is lost as:

$$F_{LA(after)} = (1 - F_{HA(before)}) * M_{LA(l)};\text{ and}$$

reallocates the resource usage based on the total of low-availability usage per spindle.

32. The system of claim 31, wherein the computer processor:

determines a total spindle usage $F_{T\ (after)}$ as:

$$F_{T(after)} = 1 + (1 - F_{HA(before)}) * \left[(1 - R_{Rf}) + \left(R_{Rf} * \frac{(D_L - 1)}{P}\right)\right] * \frac{P}{P-1};\text{ and}$$

reallocates the resource usage based on the total spindle usage.

* * * * *